United States Patent
Salkola

(10) Patent No.: US 12,527,481 B1
(45) Date of Patent: Jan. 20, 2026

(54) DETERMINING BLOOD PRESSURE USING PHOTOPLETHYSMOGRAPHY (PPG)

(71) Applicant: Meta Platforms Technologies, LLC, Menlo Park, CA (US)

(72) Inventor: Markku Salkola, Los Altos, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 379 days.

(21) Appl. No.: 17/343,165

(22) Filed: Jun. 9, 2021

Related U.S. Application Data

(60) Provisional application No. 63/147,568, filed on Feb. 9, 2021.

(51) Int. Cl.
| | |
|---|---|
| *A61B 5/021* | (2006.01) |
| *A61B 5/00* | (2006.01) |
| *A61B 5/024* | (2006.01) |
| *A61B 5/346* | (2021.01) |
| *G06N 3/08* | (2023.01) |
| *G16H 30/40* | (2018.01) |

(52) U.S. Cl.
CPC ...... *A61B 5/02108* (2013.01); *A61B 5/02416* (2013.01); *A61B 5/7267* (2013.01); *A61B 5/7278* (2013.01); *G06N 3/08* (2013.01); *G16H 30/40* (2018.01); *A61B 5/346* (2021.01)

(58) Field of Classification Search
CPC ............ A61B 5/02108; A61B 5/02416; A61B 5/7267; A61B 5/7278; A61B 5/346; G06N 3/08; G16H 30/40
See application file for complete search history.

(56) References Cited

U.S. PATENT DOCUMENTS

| | | |
|---|---|---|
| 9,596,997 B1 | 3/2017 | Ritscher et al. |
| 9,949,694 B2 | 4/2018 | Albadawi et al. |
| 2003/0208129 A1 | 11/2003 | Beker et al. |

(Continued)

FOREIGN PATENT DOCUMENTS

CN 110664390 A * 1/2020

OTHER PUBLICATIONS

Estimation and Validation of Arterial Blood Pressure Using Photoplethysmogra Morphology Features in Conjunction With Pulse Arrival Time in Large Open Databases; Seungman Yang et al., Date of publication Jul. 16, 2020 (Year: 2020).*

(Continued)

*Primary Examiner* — Anh Tuan T Nguyen
*Assistant Examiner* — Tommy T Ly
(74) *Attorney, Agent, or Firm* — Morgan, Lewis & Bockius LLP

(57) ABSTRACT

A method for determining physiological characteristics is provided. The method involves causing light to be emitted by one or more light emitters toward a tissue of a user. The method involves obtaining samples of transmitted and/or reflected light. The method involves determining photoplethysmography (PPG) data based on the obtained samples. The method involves providing the PPG data as an input to a trained machine learning model, wherein the trained machine learning model has been trained, using a training set that comprises matched samples of electrocardiogram (ECG) data and PPG data. The method involves providing a blood pressure of the user based on an output of the trained machine learning model.

27 Claims, 9 Drawing Sheets

(56) References Cited

U.S. PATENT DOCUMENTS

| | | | |
|---|---|---|---|
| 2007/0167848 | A1 | 7/2007 | Kuo et al. |
| 2014/0156197 | A1 | 6/2014 | Kim |
| 2014/0171755 | A1 | 6/2014 | LeBoeuf et al. |
| 2014/0276127 | A1 | 9/2014 | Ferdosi et al. |
| 2015/0320328 | A1 | 11/2015 | Albert |
| 2016/0166160 | A1* | 6/2016 | Casale ................ A61B 5/0295 600/480 |
| 2018/0242863 | A1 | 8/2018 | Lui |
| 2018/0249964 | A1 | 9/2018 | Qian et al. |
| 2019/0090756 | A1 | 3/2019 | Lu et al. |
| 2019/0101984 | A1 | 4/2019 | Talati et al. |
| 2019/0110755 | A1 | 4/2019 | Capodilupo et al. |
| 2019/0251401 | A1 | 8/2019 | Shechtman et al. |
| 2020/0093386 | A1 | 3/2020 | Biswas et al. |
| 2020/0100693 | A1* | 4/2020 | Velo ...................... G16H 50/20 |
| 2020/0196897 | A1* | 6/2020 | Biswas .............. A61B 5/02416 |

OTHER PUBLICATIONS

Umit et al. (hereafter Umit), "Repetitive neural network (RNN) based blood pressure estimation using PPG and ECG signals", pub. 2018 in IEEE (Year: 2018).*

"IEEE Signal Processing Cup Data 2015," IEEE signal processing Society, 2015, 4 pages, Retrieved from the Internet: URL: https://signalprocessingsociety.org/community-involvement/ieee-signal-processing-cup-2015.

Louka K., et al., "An Investigation of the Individualized, Two-Point Calibration Method for Cuffless Blood Pressure Estimation using Pulse Arrival Time: A Historical Perspective using the Casio BP-100 Digital Watch," 43rd Annual International Conference of the IEEE Engineering in Medicine & Biology Society, Nov. 2021, pp. 7493-7496.

"Physionet—The Research Resource for Complex Physiologic Signals," 2022, 6 pages, Retrieved from the Internet: URL: https://physionet.org/.

AHA: How the Healthy Heart Works, https://www.heart.org/en/health-topics/congenital-heart-defects/about-congenital-heart-defects/how-the-healthy-heart-works, downloaded Jan. 28, 2021.

Pimentel, et al. "BIDMC PPG and Respiration Dataset, 2018" https://physionet.org/content/bidmc/1.0.0/, downloaded Jan. 28, 2021.

Reisner et al., "Utility of the Photoplethysmogram in Circulatory Monitoring", Anesthesiology, vol. 108, No. 5, May 2008, pp. 950-958.

Wikipedia, "QRS Complex", https://en.wikipedia.org/wiki/QRS_complex, downloaded Jan. 28, 2021.

Zhang, et al., "Troika: A General Framework for Heart Rate Monitoring Using Wrist-Type Photoplethysmographic Signals During Intensive Physical Exercise", IEEE Transactions on Biomedical Engineering, vol. 62, No. 2, Feb. 2015, pp. 522-531.

Non-Final Office Action mailed Mar. 27, 2024 for U.S. Appl. No. 17/343,183, filed Jun. 9, 2021, 14 pages.

Final Office Action mailed Feb. 4, 2025 for U.S. Appl. No. 17/343,183, filed Jun. 9, 2021, 26 pages.

Non-Final Office Action mailed Jun. 20, 2025 for U.S. Appl. No. 17/343,183, filed Jun. 9, 2021, 36 pages.

* cited by examiner

DETERMINING BLOOD PRESSURE USING PHOTOPLETHYSMOGRAPHY (PPG)

CROSS-REFERENCE TO RELATED APPLICATIONS

This application claims priority under 35 U.S.C. § 119 to U.S. Provisional Application No. 63/147,568, filed on Feb. 9, 2021, the contents of which are hereby incorporated by reference in their entirety for all purposes.

BACKGROUND

Various physiological metrics, such as heart rate or blood pressure, may be useful to determine in a non-clinical and/or non-invasive manner. For example, it may be useful for a person to be able to easily and non-invasively monitor various physiological metrics at home to monitor a health condition. However, it may be difficult to accurately measure physiological metrics non-invasively. Inaccurate measurements may pose problems, for example, by not alerting a person to a health condition indicated by an anomalous physiological metric that was not detected. As another example, falsely indicating a physiological metric as anomalous that is within a normal range may cause undue worry or anxiety.

SUMMARY

In some aspects, a method for determining physiological characteristics includes: causing light to be emitted by one or more light emitters toward a tissue of a user; obtaining samples of transmitted and/or reflected light; determining photoplethysmography (PPG) data based on the obtained samples; providing the PPG data as an input to a trained machine learning model, wherein the trained machine learning model has been trained, using a training set that comprises matched samples of electrocardiogram (ECG) data and PPG data; and providing a blood pressure of the user based on an output of the trained machine learning model.

In some aspects, the matched samples of ECG data and PPG data comprise PPG data that has been labeled based at least in part on characteristics of the ECG data.

In some aspects, the matched samples of ECG data and PPG data comprise PPG data that has been labeled, using the ECG data, to indicate boundaries of pressure waveforms.

In some aspects, the method includes providing motion data as an input to the trained machine learning model.

In some aspects, the method includes providing at least one item of demographic information associated with the user as an input to the trained machine learning model.

In some aspects, the trained machine learning model comprises a convolutional neural network (CNN) that takes the PPG data as an input.

In some aspects, the trained machine learning model comprises a transformer network that identifies one or more portions of the PPG data that are relevant to determining the blood pressure of the user.

In some aspects, the trained machine learning model comprises a fully connected network that generates one or more output values corresponding to the blood pressure of the user.

In some aspects, the trained machine learning model comprises a first branch corresponding to a systolic blood pressure, and a second branch corresponding to a diastolic blood pressure.

In some aspects, the matched samples of ECG data and PPG data comprise data from multiple people other than the user.

In some aspects, a method for determining physiological characteristics includes: constructing a training set, wherein constructing the training set comprises, for each training sample in the training set: obtaining a series of photoplethysmography (PPG) data, a corresponding series of electrocardiogram (ECG) data, and ground truth blood pressure data, aligning the series of PPG data and the corresponding series of ECG data, and assigning labels to data points of the series of PPG data based at least in part on the alignment of the series of PPG data and the corresponding series of ECG data; training a machine learning model to generate, for each training sample in the training set, an output indicating a corresponding blood pressure; and providing one or more parameters associated with the trained machine learning model to a user device such that the user device uses the one or more parameters to determine a blood pressure of a user based on a corresponding series of PPG data of the user.

In some aspects, aligning the series of PPG data and the corresponding series of ECG data comprises determining a cross-correlation between the series of PPG data and the corresponding series of ECG data.

In some aspects, the assigned labels correspond to time points of the PPG data that correspond to boundaries of pressure waveforms in the PPG data, and the time points are identified based on a time shift corresponding to a minimum of the cross-correlation.

In some aspects, the time points correspond to R-peaks of the corresponding series of ECG data.

In some aspects, the method includes training an encoder-decoder network to reconstruct the series of PPG data, the corresponding series of ECG data, and/or a corresponding series of arterial blood pressure (ABP) data, wherein an encoder portion of the trained encoder-decoder network is a component of the machine learning model.

In some aspects, the trained machine learning model comprises a first branch corresponding to a systolic blood pressure and a second branch corresponding to a diastolic blood pressure.

In some aspects, a system for determining physiological characteristics includes: a memory; and one or more processors communicatively coupled with the memory, the one or more processors configured to: cause light to be emitted by one or more light emitters toward a tissue of a user; obtain samples of transmitted and/or reflected light; determine photoplethysmography (PPG) data based on the obtained samples; provide the PPG data as an input to a trained machine learning model, wherein the trained machine learning model has been trained, using a training set that comprises matched samples of electrocardiogram (ECG) data and PPG data; and provide a blood pressure of the user based on an output of the trained machine learning model.

In some aspects, the matched samples of ECG data and PPG data comprise PPG data that has been labeled based at least in part on characteristics of the ECG data.

In some aspects, the matched samples of ECG data and PPG data comprise PPG data that has been labeled, using the ECG data, to indicate boundaries of pressure waveforms.

In some aspects, the one or more processors are further configured to provide motion data as an input to the trained machine learning model.

In some aspects, the one or more processors are further configured to provide at least one item of demographic information associated with the user as an input to the trained machine learning model.

In some aspects, a system for determining physiological characteristics includes: a memory; and one or more processors communicatively coupled with the memory, the one or more processors configured to: construct a training set, wherein constructing the training set comprises, for each training sample in the training set: obtain a series of photoplethysmography (PPG) data, a corresponding series of electrocardiogram (ECG) data, and ground truth blood pressure data, align the series of PPG data and the corresponding series of ECG data, and assign labels to data points of the series of PPG data based at least in part on the alignment of the series of PPG data and the corresponding series of ECG data; train a machine learning model to generate, for each training sample in the training set, an output indicating a corresponding blood pressure; and provide one or more parameters associated with the trained machine learning model to a user device such that the user device uses the one or more parameters to determine a blood pressure of a user based on a corresponding series of PPG data of the user.

In some aspects, aligning the series of PPG data and the corresponding series of ECG data comprises determining a cross-correlation between the series of PPG data and the corresponding series of ECG data.

In some aspects, the assigned labels correspond to time points of the PPG data that correspond to boundaries of pressure waveforms in the PPG data, and the time points are identified based on a time shift corresponding to a minimum of the cross-correlation.

In some aspects, the time points correspond to R-peaks of the corresponding series of ECG data.

In some aspects, the one or more processors are further configured to train an encoder-decoder network to reconstruct the series of PPG data, the corresponding series of ECG data, and/or a corresponding series of arterial blood pressure (ABP) data, an encoder portion of the trained encoder-decoder network is a component of the machine learning model.

In some aspects, the trained machine learning model comprises a first branch corresponding to a systolic blood pressure and a second branch corresponding to a diastolic blood pressure.

BRIEF DESCRIPTION OF THE DRAWINGS

Illustrative embodiments are described in detail below with reference to the following figures.

Figure 1:
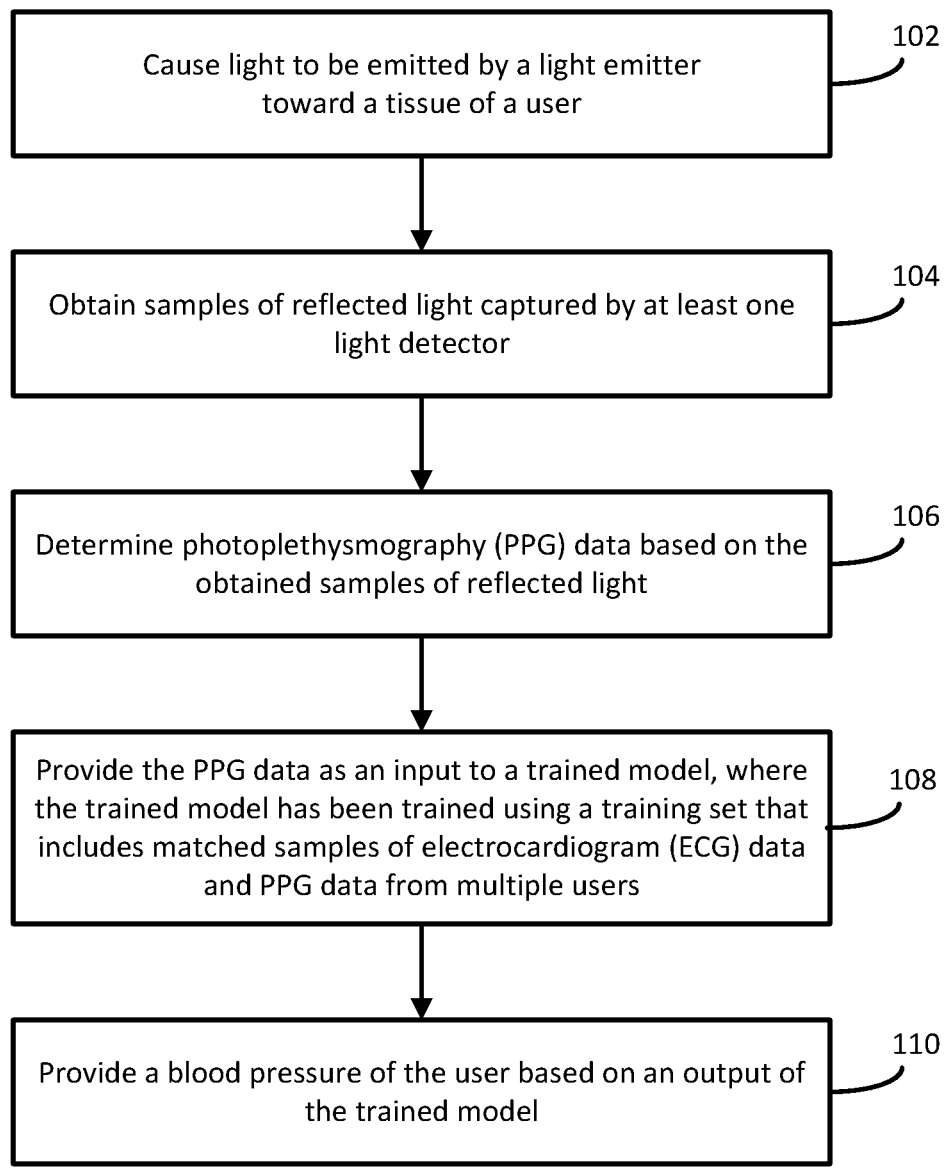
FIG. 1 is a flowchart of an example process that can be used for determining blood pressure using photoplethysmography (PPG) measurements according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

An ability to accurately determine physiological metrics, such as heart rate, blood pressure, or the like using non-invasive techniques has enormous potential. For example, accurate, non-invasive determination of physiological metrics may be useful for people to monitor health conditions at home. Photoplethysmography (PPG) provides a non-invasive technique for collecting physiological data. In particular, light may be emitted toward tissue of a person (e.g., toward skin, blood, bone, etc.). The light may be transmitted through tissue (e.g., where the tissue is relatively thin, such as a finger, fingertip or ear lobe tissue) or reflected off of tissue. The transmitted and/or reflected light may be captured by one or more light detectors. Characteristics of the reflected light, such as a percentage of light reflected and/or absorbed at various wavelengths, may be used to generate a series of PPG data. For example, light emitters and/or light detectors may be conveniently placed, for example, in or on a frame of a watch, in or on a frame of a head mount display (HMD), or the like. As another example, one or more camera sensors of a mobile device or other computer may be used to capture reflected and/or transmitted light. Camera data may be used to perform PPG, for example, based on a video signal obtained by the one or more camera sensors. In some embodiments, remote PPG may be performed, for example, by transmitting video signal obtained from one or more camera sensors to a remote server. PPG data may therefore be convenient to obtain.

The techniques described herein relate to generating accurate estimates blood pressure based on PPG data. In particular, as described in more detail in connection with FIG. 1, a series of PPG data may be used as an input to a trained machine learning model, which may generate an output corresponding to blood pressure. An indicated blood pressure may include a systolic blood pressure and/or a diastolic blood pressure. The machine learning model may be trained using electrocardiogram (ECG) data and/or blood pressure data (e.g., arterial blood pressure, or ABP) measurements), which may be measured clinically. The machine learning model may also be trained using demographics and/or vital signs other than the blood pressure. By training the machine learning model using "gold standard" clinical data (i.e., ECG data and/or blood pressure data), the machine learning model may more accurately generate a blood pressure estimate.

As described in more detail in connection with FIG. 2, ECG data may be used to label PPG data included in a training set. For example, the ECG data may be used to label time points of the PPG data that correspond to boundaries of pressure waveforms. In some embodiments, a series of PPG data may be labeled using a corresponding series of ECG data (e.g., a series of ECG data measured concurrently with the series of PPG data on the same person) by cross-correlating the series of PPG data and the series of ECG data. For example, boundaries of pressure waveforms may be identified and/or labeled in the series of PPG data by minimizing a cross-correlation between the series of ECG data and the series of PPG data. By constructing a training set of PPG data that has been labeled using "gold standard" ECG data, the machine learning model may benefit from enhanced PPG data. In particular, the labeled PPG data may allow the machine learning model to identify features of the PPG data most relevant to determining blood pressure.

As shown in and described below in connection with FIGS. 4A-4D, 5A, and 5B, a machine learning model may have various types of architecture. For example, a machine learning model may include one or more convolutional neural networks (CNNs), one or more transformer networks, and/or one or more fully connected networks. Each sub-network of the machine learning model may serve a different purpose. For example, a CNN may serve to condition an input series of PPG data. As a more particular example, the CNN may extract particular features of the input series of PPG data, enhance particular features of the input series of PPG data, or the like. As another example, a transformer network may generate an attention vector that indicates particular time points of PPG data that are of particular relevance to determination blood pressure. As yet another example, a fully connected network may project an output of a transformer network to a physiological metric, such as a systolic blood pressure and/or a diastolic blood pressure.

A machine learning model may be trained on one or more servers using training data. The training data may be obtained from a database, such as a database that stores medical data (e.g., PPG data, ECG data, blood pressure data, or the like) from multiple people (e.g., patients in a health-care setting). For example, the medical data may include concurrently obtained PPG data, ECG data, and/or blood pressure data obtained on the same person at different time points (e.g., measured once per hour, once per two hours, or the like). In some embodiments, parameters associated with a trained machine learning model, such as one or more weights, may be transmitted to a user device (e.g., a mobile device, a wearable computer, or the like) for use by the user device to determine physiological metrics based on PPG data at inference time. The user device may store the one or more parameters in local memory.

The methods, systems, apparatuses, and media described herein may be used in conjunction with various technologies, such as an artificial reality system. An artificial reality system, such as a head-mounted display (HMD) or heads-up display (HUD) system, generally includes a display configured to present artificial images that depict objects in a virtual environment. The display may present virtual objects or combine images of real objects with virtual objects, as in virtual reality (VR), augmented reality (AR), or mixed reality (MR) applications. For example, in an AR system, a user may view both displayed images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through). In some AR systems, the artificial images may be presented to users using an LED-based display subsystem.

In some embodiments, the methods, systems, apparatuses, and media described herein may be implemented in connection with a wearable computer, such as a smart watch, a fitness tracker, a HMD, or the like. For example, such a wearable computer may include one or more light emitters and/or one or more light sensors incorporated into a portion of an enclosure of the wearable computer such that light can be emitted toward a tissue of a wearer of the wearable computer that is proximate to or touching the portion of the enclosure of the wearable computer. Example locations of such a portion of an enclosure of a wearable computer may include a portion configured to be proximate to an ear of the wearer (e.g., proximate to a superior tragus, proximate to a superior auricular, proximate to a posterior auricular, proximate to an inferior auricular, or the like), proximate to a forehead of the wearer, proximate to a wrist of the wearer, proximate to a finger tip of the wearer, proximate to a base of a finger of a wearer, proximate to a toe tip of a wearer, or the like.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a flowchart of an example process 100 for determining a blood pressure of a user based on PPG data associated with the user in accordance with some embodiments. In some embodiments, blocks of process 100 may be implemented on a user device, such as a mobile device. Examples of mobile devices that may implement one or more blocks of process 100 may include a mobile phone, a wearable computer (e.g., an HMD, a smart watch, a fitness tracker, or the like), etc. An example computational system that may be used by such a user device is shown in and described below in connection with FIG. 7. It should be noted that, in some embodiments, one or more blocks of process 100 may be performed substantially in parallel. Additionally, in some embodiments, one or more blocks of process 100 may be omitted. It should be understood that the blocks of process 100 may be performed in an order not illustrated in FIG. 1.

Process 100 can begin at 102 by causing light to be emitted by a light emitter toward a tissue of a user. The light emitter may be an LED, a vertical-cavity surface emitting laser (VCSEL), an edge VCSEL (e-VCSEL), or the like. In some embodiments, process 100 may cause multiple light emitters (e.g., five light emitters, ten light emitters, or the like) to emit light toward the tissue of the user. The light emitter may emit light of any suitable wavelengths, such as in a green wavelength (e.g., in a range of about 495 nanometers-570 nanometers), in a red wavelength (e.g. in a range of about 625 nanometers-740 nanometers), and/or in an infrared wavelength (e.g., in a range of about 760 nanometers-1000 nanometers), or any combination thereof. The wavelengths may be selected, for example, based on a difference in reflection and/or absorption spectrums of oxygenated and/or deoxygenated blood.

At 104, process 100 may obtain samples of reflected light captured by at least one light detector. The reflected light may be reflected off external tissue (e.g., an external layer of skin) of the user, or off of one or more internal elements within a body of the user proximate to the tissue. The one or more internal elements may include blood vessels (e.g., capillaries, arterioles, veins, arteries, or the like), bone, internal layers of skin, or the like.

At 106, process 100 may determine PPG data based on the obtained sampled of reflected light. For example, in some embodiments, process 100 may determine one or more characteristics of the reflected light based on the obtained samples. Process 100 may then determine the PPG data based on the one or more characteristics of the reflected light. The one or more characteristics of the reflected light may include an amount of reflected light at different wavelengths. In some embodiments, process 100 may determine AC and DC components of the obtained samples. For example, in some embodiments, process 100 may determine AC and DC components of samples of reflected light in the AC and DC components of samples of reflected light in the green wavelength range (referred to herein as $AC_{green}$ and $DC_{green}$), AC and DC components of samples of reflected light in the red wavelength range (referred to herein as $AC_{red}$ and $DC_{red}$) and AC and DC components of samples of reflected light in the infrared wavelength range (referred to herein as $AC_{IR}$ and $DC_{IR}$). In some embodiments, the PPG data may be a time series of data that is determined based on the one or more characteristics of the reflected light. It should be noted that the PPG data may span any suitable time range or time period, such as five seconds, thirty seconds, one minute, or the like.

At 108, process 100 can provide the PPG data as an input to a trained model, where the trained model has been trained using a training set that includes matched samples of ECG data and PPG data from multiple users. It should be noted that the multiple users may or may not include a wearer of the user device executing process 100. The trained model may be configured and/or trained to take, as an input, a series of PPG data from a user and predict a blood pressure of the user at a time corresponding to a time associated with the series of PPG data. In some embodiments, the trained model may be trained using a training set that includes PPG data that has been labeled based on characteristics of the ECG data obtained concurrently with the PPG data. For example, the PPG data in the training set may have been labeled to indicate time points corresponding to R peaks of QRS waves of the ECG data. As another example, the PPG data in the training set may have been labeled to indicate boundaries of pressure waveforms that have been identified based at least in part on the ECG data. More detailed techniques for generating such a trained model are shown in and described below in connection with FIG. 2.

It should be noted that, in some embodiments, process 100 may pre-process the PPG data prior to providing the PPG data to the trained model. For example, in some embodiments, process 100 may perform various filtering techniques on the PPG data to de-noise the PPG data. As another example, in some embodiments, process 100 may identify one or more outliers or anomalous data points in the PPG data (e.g., by identifying data points outside of an expected range, by using an anomaly detection classifier, or the like) and may remove identified outliers or anomalous data points.

In some embodiments, process 100 may provide one or more other items of information as input to the trained model such that the trained model predicts the blood pressure of the user based at least in part on the one or more items of information in conjunction with the PPG data. Examples of other information include motion data (e.g., from an accelerometer of a mobile device or wearable computer executing process 100), demographic information of the user (e.g., an age of the user, a typical activity level of the user, etc.), recent activity information indicating recent or prior activities the user engaged in (e.g., information indicating that the user was recently exercising, information indicating that the user recently woke up, etc.), or the like. In some embodiments, process 100 may determine, retrieve, or otherwise obtain any of the one or more items of information from a memory of the user device. For example, in some embodiments, process 100 may determine a typical activity level of the user based on stored activity data (measured, e.g., using an accelerometer of the user device) over any suitable time period (e.g., the past week, the past month, the past year, etc.). As another example, in some embodiments, process 100 may determine recent activity of the user based on recent (e.g., within the past hour, etc.) accelerometer data stored in memory of the user device.

In some embodiments, process 100 may provide the PPG data and, optionally, one or more other items of information, to the trained model by generating an input data vector that includes the PPG data and/or the one or more other items of information. In some embodiments, process 100 may store parameters associated with the trained model locally (e.g., in memory of the user device executing process 100). Process 100 may then apply the input data vector to the trained model by using the stored parameters to predict the blood pressure of the user. Parameters associated with the trained model may be received, for example, from a server that generates the trained model, as described below in connection with FIG. 2.

In some embodiments, the trained model may generate a predicted blood pressure. The predicted blood pressure may include a systolic blood pressure and/or a diastolic blood pressure.

At 110, process 100 can provide an indication of the predicted blood pressure of the user based on the output of the trained model. For example, in some embodiments, process 100 may cause a user interface that includes an indication of the predicted blood pressure to be presented on a display of the user device executing process 100. In some embodiments, process 100 may cause the predicted blood pressure measurement to be stored, for example, in local memory of the user device executing process 100, in memory of an external server and/or in an external database, or the like. In some embodiments, process 100 may cause the predicted blood pressure measurement to be transmitted to a third-party application not associated with prediction of the blood pressure measurement. Examples of such third-party applications include a mobile application associated with health or fitness, a mobile application associated with an Electronic Health Record (EHR) system, or the like. It should be noted that messages transmitted to external devices that includes indications of predicted blood pressure measurements may be encrypted using any suitable encryption protocol to preserve user privacy.

Figure 2:
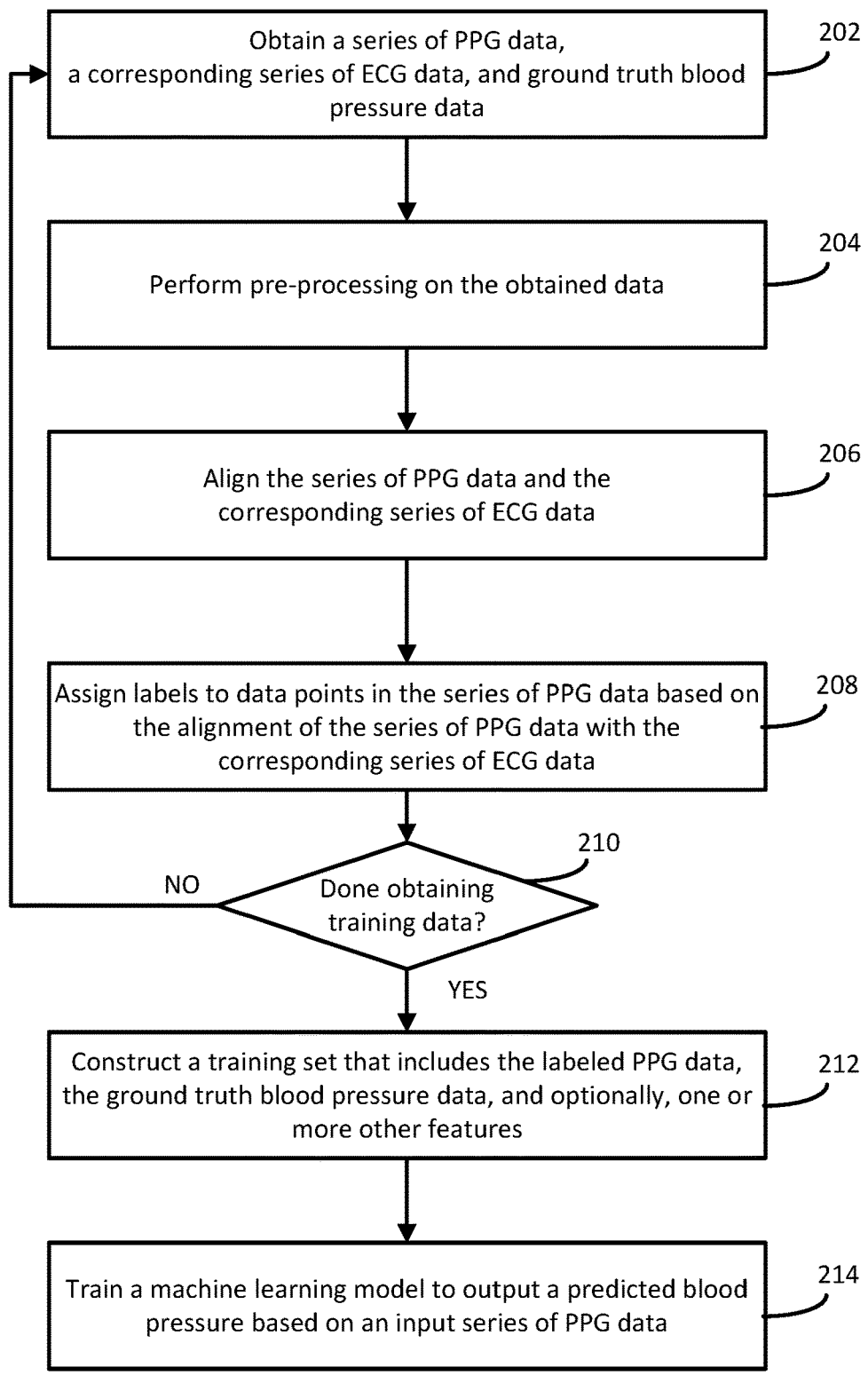
FIG. 2 is a flowchart of an example process for training a machine learning model to predict blood pressure based on PPG measurements according to certain embodiments.

FIG. 2 is a flowchart that depicts an example process 200 for training a machine learning model to predict a blood pressure of a user based on PPG data associated with the user. In some embodiments, blocks of process 200 may be executed by a server. An example computational system that may be used by such a server is shown in and described below in connection with FIG. 7. It should be noted that, in some embodiments, one or more blocks of process 200 may be performed substantially in parallel. Additionally, in some embodiments, one or more blocks of process 200 may be omitted. It should be understood that the blocks of process 200 may be performed in an order not illustrated in FIG. 2.

It should be noted that blocks 202-208 describe techniques for constructing a training sample for inclusion in a training set for training a machine learning model that predicts blood pressure based on PPG data. Blocks 202-208 may be looped through or iterated over for multiple (e.g., hundreds, thousands, or the like) sets of data to generate a suitable training set.

At 202, process 200 can obtain a series of PPG data, a corresponding series of ECG data, and ground truth blood pressure data. For example, the series of PPG data and the corresponding series of ECG data may have been measured on the same person (e.g., patient in a healthcare setting) and concurrently (e.g., simultaneously or substantially simultaneously). The PPG data may have been obtained from measured reflected light from any suitable portion of the body of the user (e.g., finger, earlobe, forehead, or the like). The ECG data may have been obtained, for example, using a 12-lead ECG system. In some embodiments, the ground truth blood pressure data may comprise an ABP waveform, which may have been measured concurrently with the series of PPG data and/or the series of ECG data. The ABP waveform may indicate a diastolic blood pressure, a systolic blood pressure, a mean arterial pressure (MAP), etc. In some embodiments, ground truth blood pressure data may be measured non-invasively, e.g., using a sphygmomanometer. Ground truth blood pressure data may be represented as a systolic blood pressure and/or a diastolic blood pressure.

The series of PPG data, the corresponding series of ECG data, and/or the ground truth blood pressure data may be obtained, for example, from a database that stores physiological measurements obtained from multiple people (e.g., patients in a healthcare setting, such as a hospital). It should be noted that, in some embodiments, the series of PPG data and/or the series of ECG data may be anonymized, for example, by removing names associated with the data. In some embodiments, process 100 may obtain any other suitable information associated with a user corresponding to the obtained data. The information may include demographic information of the person (e.g., an age of the person), any clinical diagnoses that may have been made, medications prescribed to the person, or the like.

It should be noted that, in some embodiments, process 100 may discard a set of obtained data based on various criteria. In other words, process 100 may determine that the set of obtained data (which may include a series of PPG data, a corresponding series of ECG data, corresponding ground truth blood pressure data, and/or any other items of information) is not to be included in a training set based on the criteria. The criteria may include that the ground truth blood pressure associated with the series of PPG data is outside of a particular range (e.g., a systolic blood pressure outside of a predetermined range and/or a diastolic blood pressure outside of a predetermined range), that a person associated with the PPG data has a known health condition (e.g., congestive heart failure, has recently gone into cardiac arrest, or the like), that an age of the person associated with the PPG data is outside of a predetermined range, that the person was taking particular medications at a time the data was obtained, and/or any other suitable criteria.

At 204, process 200 may perform pre-processing on the obtained data. Pre-processing may be performed on the series of PPG data, the series of ECG data, and/or a series of ABP data. In some embodiments, pre-processing may be performed to remove or discard erroneous or anomalous data. Examples of erroneous or anomalous data may include data that includes clipped peak values, flat lines (e.g., little to no signal variation, which may indicate malfunctioning sensors or other equipment), data that includes large discontinuities, or the like. In some embodiments, ground truth blood pressure data may be discarded in an instance in which the ground truth blood pressure data includes a set of systolic and/or diastolic blood pressures with a variance greater than a predetermined threshold.

In some embodiments, pre-processing may be performed to filter the obtained data, for example, to remove noise. In some embodiments, filtering may be performed using a bandpass filter (e.g., a Butterworth filter, a Chebyshev filter, and/or any other suitable type of bandpass filter). Example passbands may be 0.5 Hz-15 Hz, 0.2 Hz-20 Hz, or the like. In some embodiments, a series of obtained data may be normalized such that the normalized data is within a particular range of values (e.g., −1 to 1). For example, the series of PPG data and/or the series of ECG data may be normalized. Additionally or alternatively, in some embodiments, a series of data may be aggregated over any suitable time window (e.g., using a moving average window, or the like) to reduce effects due to respiration. The time window may have a duration of 10 seconds, 15 seconds, 20 seconds, 25 seconds, or the like.

At 206, process 200 can align the series of PPG data and the corresponding series of ECG data. For example, in some embodiments, process 200 can align the series of PPG data with the corresponding series of ECG data to identify time points in the series of PPG data that correspond to QRS complexes in the series of ECG data. As a more particular example, in some embodiments, process 200 can identify time points in the series of PPG data that correspond to QRS complexes in the series of PPG data by performing a cross-correlation between the series of PPG data and the corresponding series of ECG data. Continuing with this more particular example, the time points corresponding to the QRS complexes may by identified by maximizing the cross-correlation of the series of PPG data and the corresponding series of ECG data. After aligning the series of PPG data and the series of ECG data by shifting the PPG data by a time shift corresponding to a time delay associated with the maximum correlation, a PPG data sample at a time point corresponding to a time point indicated as an R-peak in the corresponding series of ECG data may also be classified as an R-peak.

As another example, in some embodiments, process 200 can align the series of PPG data with the corresponding series of ECG data to identify boundaries of pressure waveforms in the series of PPG data. As a more particular example, in some embodiments, process 200 can identify the boundaries of pressure waveforms in the series of PPG data by performing a cross-correlation between the series of PPG data and the corresponding series of ECG data. Continuing with this more particular example, time points corresponding to the boundaries of the pressure waveform may be identified based on a time shift that gives a minimum correlation of the cross-correlation. As another more particular example, in some embodiments, such as in an instance in which a Pulse Transit Time (PTT) is known for the obtained data, process 200 can identify the boundaries of the pressure waveforms in the series of PPG data by shifting the series of ECG data by a time shift corresponding to the PTT. In either example, after time shifting the ECG data (e.g., based on a time shift associated with a minimum of the cross-correlation or based on the PTT), the boundaries of the pressure waveform in the PPG data may be identified as time points corresponding to the peaks of the R wave in the QRS complexes of the series of ECG data. It should be noted that, in some embodiments, process 200 may time-shift the series of PPG data relative to the series of ECG data. In other words, either series of data may be time shifted.

Figure 3:
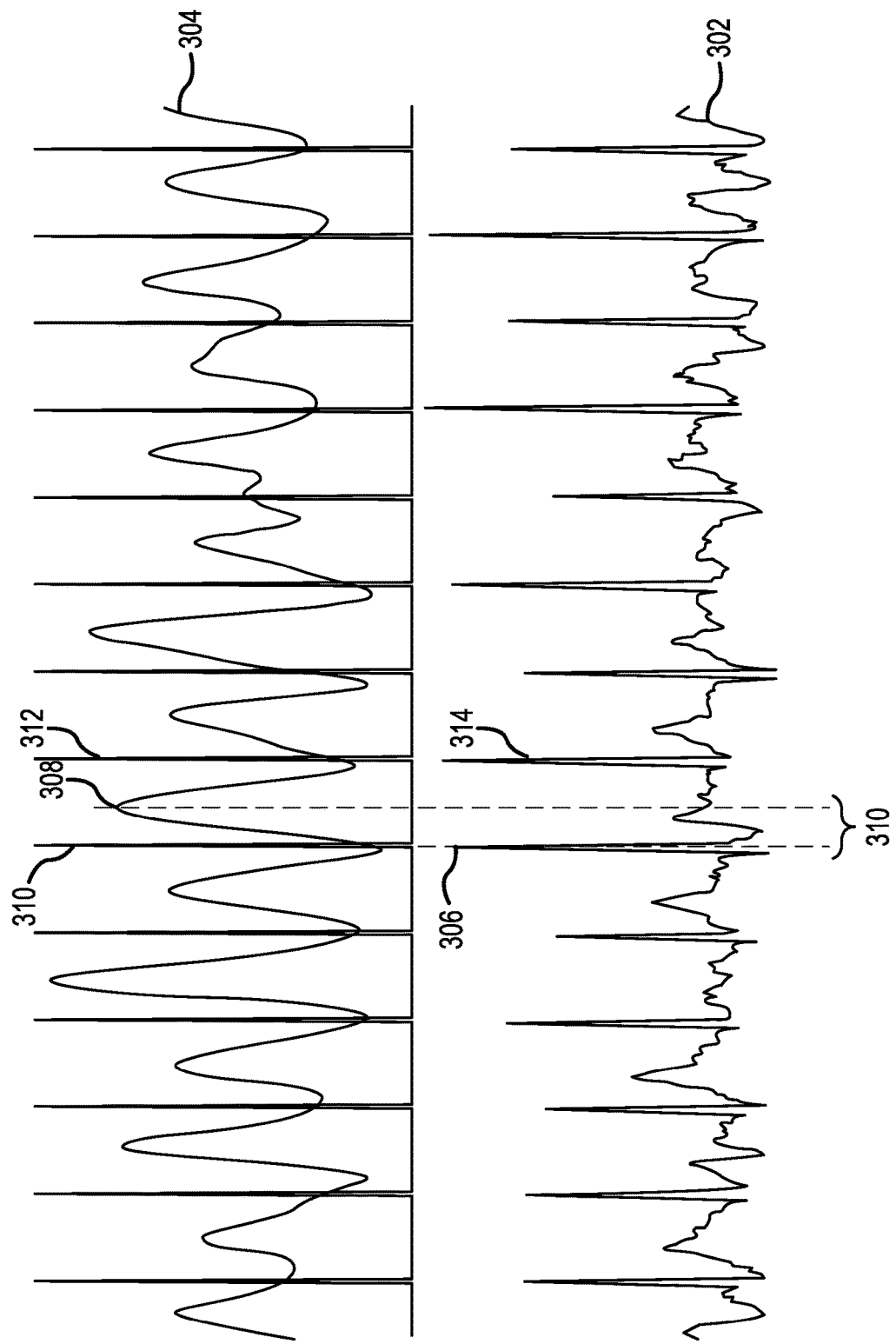
FIG. 3 shows a representation of example PPG and electrocardiogram (ECG) waveforms.

Turning to FIG. 3, an example representation of a series of ECG data 302 and a series of PPG data 304. As illustrated, ECG data 302 may be time-shifted relative to PPG data 304. The time shift may be based on a time delay associated with minimizing a cross-correlation of ECG data 302 and PPG data 304. Additionally or alternatively, in some embodiments, the time shift may be based on a PTT 310. PTT 310 corresponds to a time duration between an R-peak 306 in ECG data 302 and a peak 308 in PPG data 304. Once ECG data 302 has been time-shifted relative to PPG data 304, pressure waveform boundaries 310 and 312 may be identified and labeled. For example, pressure waveform boundary 310 may be labeled as a time point of ECG data 302 that corresponds to a time point of R-peak 306. As another example, pressure waveform boundary 312 may be labeled as a time point of ECG data 302 that corresponds to a time point of R-peak 314.

Referring back to FIG. 2, at 208, process 200 can assign labels to data points in the series of PPG data based on the alignment of the series of PPG data with the corresponding series of ECG data. For example, in some embodiments, the labels can include a binary value indicating whether the data point in the series of PPG data corresponds to an R wave. As another example, in some embodiments, the labels can include a binary value indicating whether the data point in the series of PPG data corresponds to a boundary between two pressure waveforms. As a more a more particular example, time points corresponding to pressure waveform boundaries 310 and 312 of FIG. 3 may be classified as "1," to indicate the pressure waveform boundaries, while time points between pressure waveform boundaries 310 and 312 may be classified as "0."

At 210, process 200 can determine whether process 200 is done obtaining training data. For example, in some embodiments, process 200 can determine that process 200 is done obtaining training data ("yes" at 210) in response to determining that data for generating more than a predetermined number (e.g., 100, 200, 1000, or the like) of training samples of a training set has been obtained during previous iterations through blocks 202-208. By contrast, in some embodiments, process 200 can determine that process 200 is not done obtaining training data ("no" at 210) in response to determining that data for generating a predetermined number (e.g., 100, 200, 1000, or the like) of training samples of a training set has not yet been obtained.

If, at 210, process 200 determines that process 200 is not done obtaining training data ("no" at 210), process 200 can loop back to block 202. Process 200 can obtain another series of PPG data, a corresponding series of ECG data, and ground truth blood pressure data. For example, in some embodiments, process 200 can obtain data from the same person but corresponding to a different time period (e.g., an hour later, two hours later, or the like). As another example, in some embodiments, process 200 can obtain data corresponding to a different person.

Conversely, if, at 210, process 200 determines that process 200 is done obtaining training data ("yes" at 210), process 200 can proceed to block 212 and can construct a training set that includes the labeled PPG data, the ground truth blood pressure data, and optionally, one or more other features. For example, each training sample of the training set may include a separate labeled series of PPG data (e.g., labeled based on the corresponding series of ECG data), corresponding ground truth blood pressure data, and/or one or more other features. Examples of the one or more other features may include demographic information associated with a person corresponding to the training sample (e.g., an age of the person, or the like), a heart rate of the user (e.g., which may be extracted from the corresponding series of ECG data), a pulse wave velocity, or the like. It should be noted that, in some embodiments, the corresponding series of ECG data may itself be included in a training sample.

At 214, process 200 can train a machine learning model to output a predicted blood pressure based on an input series of PPG data. The machine learning model may be trained using the training set constructed at block 212. In some embodiments, the machine learning model may be trained to output a systolic blood pressure and/or a diastolic blood pressure. It should be noted that, although the machine learning model is trained using PPG data that has been labeled based on corresponding ECG data, and optionally, based on one or more other features which may be clinically measured (e.g., pulse wave velocity, or the like), the machine learning model may be trained to output the predicted blood pressure, at an inference time, for input PPG data that has not been labeled using ECG data and/or without other clinically measured data.

The machine learning model may have any suitable type of architecture or topology. For example, in some embodiments, the machine learning model may include one or more CNNs that are trained to extract features of a series of PPG data. As another example, in some embodiments, the machine learning model may include one or more filtering blocks (e.g., blocks that implement a Fourier transform block, a short-time Fourier transform (STFT), a wavelet transform, or the like). In instances in which one or more CNNs and/or one or more filtering blocks are implemented in a machine learning model, the one or more CNNs and/or the one or more filtering blocks may effectively serve to condition an input series of PPG data. For example, conditioning the input series of PPG data may include amplifying features identified by the one or more CNNs. As another example, conditioning the input series of PPG data may include de-noising the input series of PPG data via the one or more filtering blocks. It should be noted that a CNN may have any suitable number of convolutional and/or deconvolutional layers (e.g., one, two, four, eight, or the like). In some embodiments, each convolutional layer may be followed by a non-linear layer (e.g., a rectified linear unit layer, or the like), by a batch normalization layer, by a pooling layer (e.g., a max pooling layer, or the like), or a dropout layer (e.g., during training).

In some embodiments, the machine learning model may include one or more transformer networks that are trained to identify relationships between time points of features of the PPG data that are relatively important for determining blood pressure. In some embodiments, a transformer network may be trained to determine an attention vector that indicates relative importance of various time point or various features of an input series of PPG data to determining a corresponding systolic blood pressure and/or a corresponding diastolic blood pressure. In some embodiments, a transformer network may effectively perform domain transformation between feature-space (e.g., corresponding to features identified or output by one or more CNNs that provide input to the one or more transformer networks) and physiological metric-space (e.g., a systolic and/or diastolic blood pressure). In some embodiments, a transformer network may be implemented as one or more encoders that incorporate one or more attention models that are used to generate indicate portions of an input series of PPG data that the model is to weight more heavily (i.e., pay attention to). A transformer network may be implemented using for example, the techniques described in "Attention Is All You Need" by A. Vaswani, N. Shazeer, N. Parmar, J. Uszkoreit, L. Jones, A. Gomez, L. Kaiser, and I. Polosukhin in $31^{st}$ Conference on Neural Information Processing Systems (NIPS 2017), Long Beach, California, United States, which is hereby incorporated by reference herein in its entirety In some embodiments, the machine learning model may be one or more regressors for mapping an output of one or more layers of the machine learning model to a systolic blood pressure and/or a diastolic blood pressure (e.g., for mapping outputs of the one or more layers to a numeric value). In some embodiments, the regressors may be implemented using one or more fully connected networks. Such a fully connected network may provide one or more continuous values corresponding to a systolic blood pressure and/or a diastolic blood pressure. Alternatively, in some embodiments, the regressors may be implemented so that the outputs of the transformers may be added together, averaged, interpolated between, and/or otherwise combined to provide one or more continuous values corresponding to a systolic blood pressure and/or a diastolic blood pressure.

Example architectures for a machine learning model are shown in and described below in more detail in connection with FIGS. 4A-4D, 5A, and 5B. In particular, FIGS. 4A-4D depict example machine learning model architectures that utilize various combinations of CNNs, transformer networks, and/or fully connected networks. FIGS. 5A and 5B depict example machine learning model architectures that utilize information sharing from previous time steps. It should be noted that any networks implemented in a machine learning model (e.g., a CNN, a transformer network, a fully connected network, or the like) may be implemented using techniques known to those skilled in the art. In some embodiments, training a machine learning model may involve optimizing or minimizing one or more loss functions, which are described below in more detail.

Figure 4A:
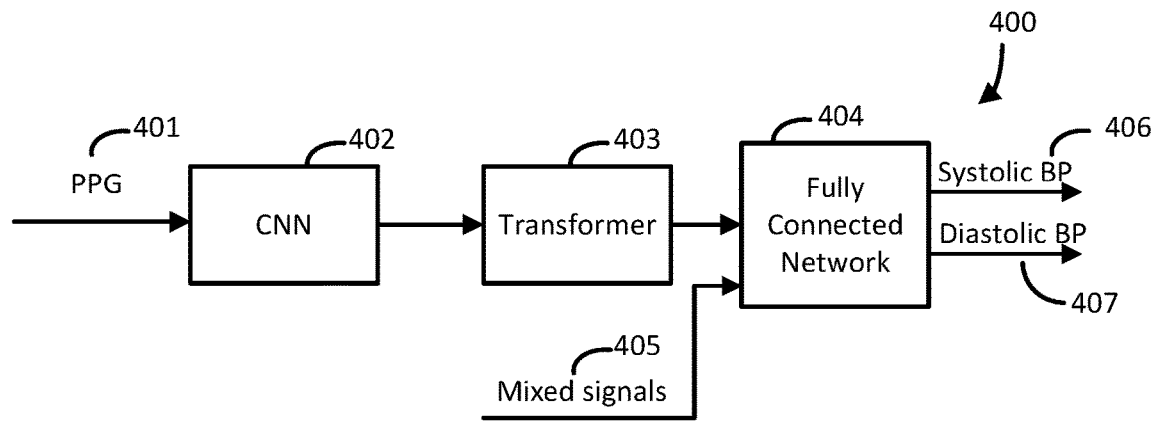
FIGS. 4A, 4B, 4C, and 4D show example machine learning model architectures for predicting blood pressure based on PPG data according to certain embodiments.
Figure 5A:
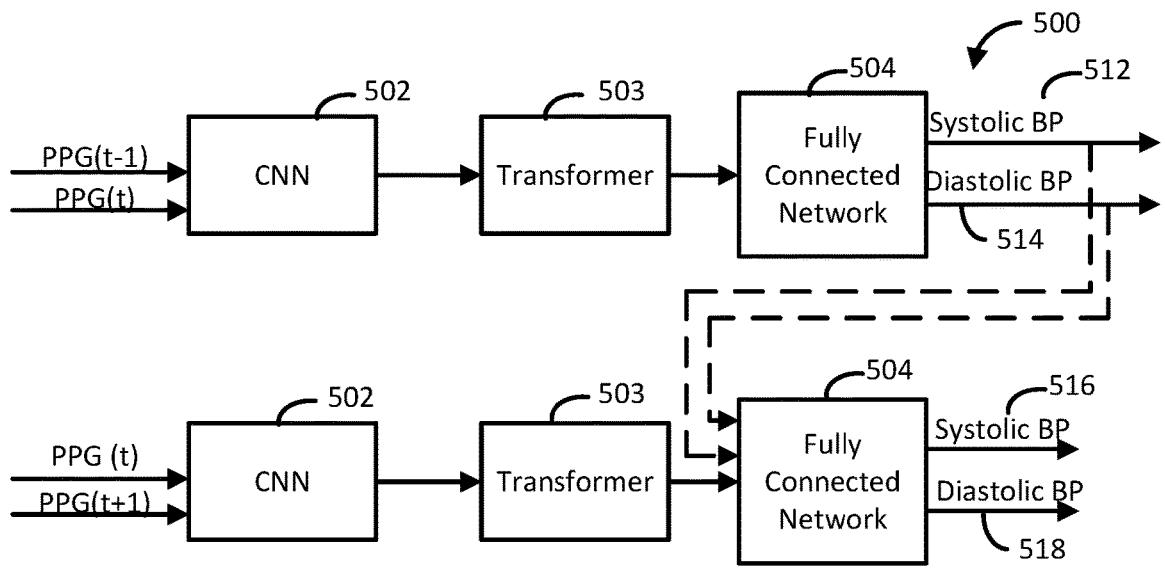
FIGS. 5A and 5B show example machine learning model architectures for predicting blood pressure based on PPG data according to certain embodiments.
Figure 5B:
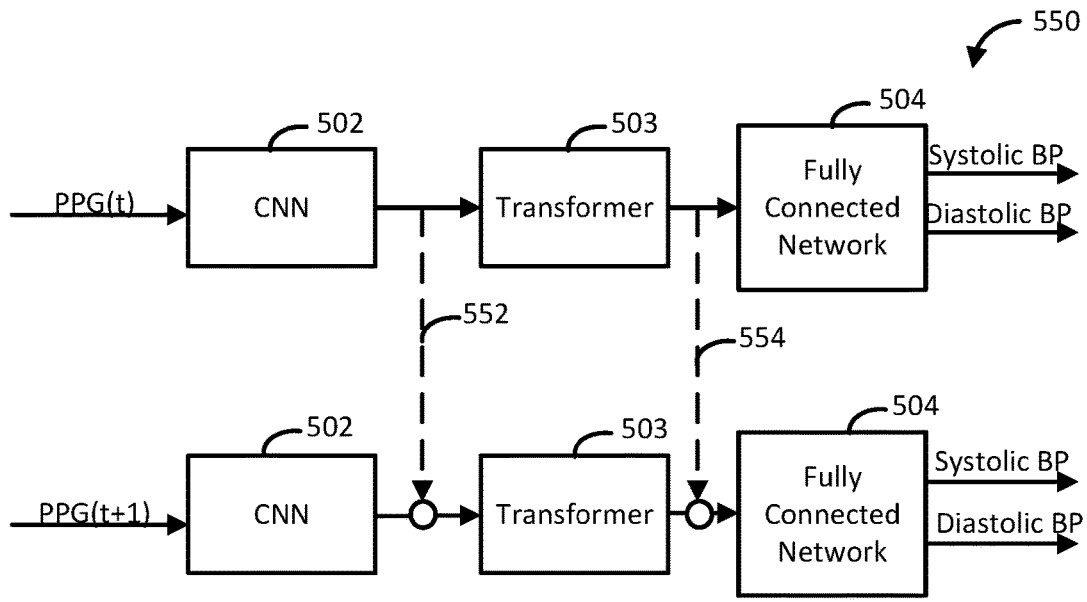

In an example architecture 400 shown in FIG. 4A, systolic blood pressure and diastolic blood pressure are generated by a single branch of architecture 400. In particular, an input series of PPG data 401 may be input to a CNN 402. An output of CNN 402 may be used as an input to a transformer network 403. The output of transformer network 403 may be used as an input to a fully connected network 404. In some embodiments, fully connected network 404 may receive mixed signals 405, as illustrated in FIG. 4A. In some embodiments, mixed signals 405 may include various other features or information, such as motion information (e.g., collected or measured from an accelerometer), demographic information, or the like. In some embodiments, mixed signals 405 may include other items of information described above in connection with block 212 of FIG. 2. Fully connected network 404 generates a systolic blood pressure 406 and a diastolic blood pressure 408. Systolic blood pressure 406 and diastolic blood pressure 408 may be continuous values.

In some embodiments, training the machine learning model shown in architecture 400 may involve learning weights of CNN 402, transformer network 403, and/or fully connected network 404. In some embodiments, the weights may be learned by minimizing a loss function. The loss function may correspond to a combined error of systolic blood pressure 406 and diastolic blood pressure 407 relative to a ground truth systolic blood pressure and a ground truth diastolic blood pressure. The combined error may be, for example, a mean squared error, a mean absolute error, or a combination of thereof.

Figure 4B:
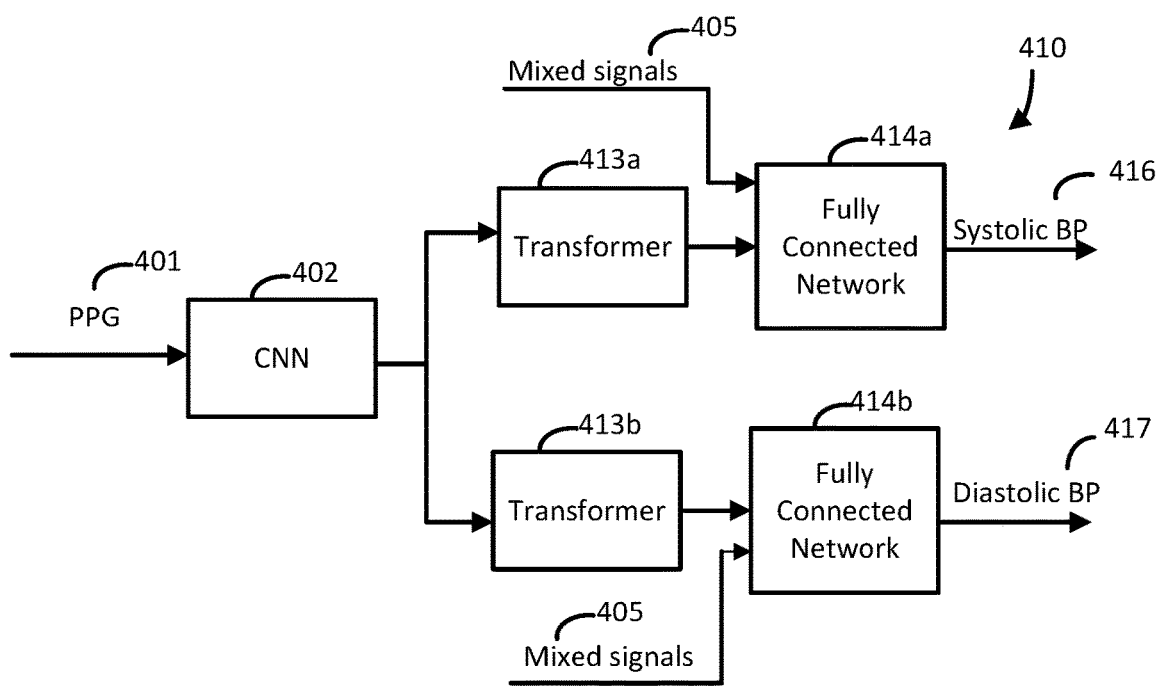

Turning to FIG. 4B, an example architecture 410 is shown in which systolic blood pressure and diastolic blood pressure are generated by two different branches of architecture 410. As illustrated, input series of PPG data 401 is input to CNN 402, similar to what is shown in and described above in connection with FIG. 4A. The output of CNN 402 is used as an input to a transformer network 413a that corresponds to a systolic blood pressure branch, and also as an input to a transformer network 413b that corresponds to a diastolic blood pressure branch. In effect, transformer network 413a may be trained to learn features of the PPG data that are of relative importance to determining a systolic blood pressure, and transformer network 413b may be trained to learn features of the PPG data that are of relative importance to determining a diastolic blood pressure. The output of transformer network 413a may be used as an input to a fully connected network 414a. Fully connected network 414a may generate a systolic blood pressure 416. The output of transformer network 413b may be used as an input to a fully connected network 414b. Fully connected network 414b may generate a diastolic blood pressure 417. In some embodiments, fully connected network 414a and fully connected network 414b may each receive mixed signals 405.

In some embodiments, training the machine learning model shown in architecture 410 may involve learning weights of CNN 402, transformer network 413a, transformer network 413b, fully connected network 414a, and/or fully connected network 414b. In some embodiments, the weights may be learned by minimizing one or more loss functions. For example, a loss function used to determine weights of CNN 402 may correspond to a combined error of systolic blood pressure 416 and diastolic blood pressure 417 relative to a ground truth systolic blood pressure and a diastolic blood pressure, respectively. As another example, a loss function used to determine weights of transformer network 413a and/or fully connected network 414a (corresponding to the systolic blood pressure branch) may be based on an error of systolic blood pressure 416 relative to a ground truth systolic blood pressure. As yet another example, a loss function used to determine weights of transformer network 413b and/or fully connected network 414b (corresponding to the diastolic blood pressure branch) may be based on an error of diastolic blood pressure 417 relative to a ground truth diastolic blood pressure.

Figure 4C:
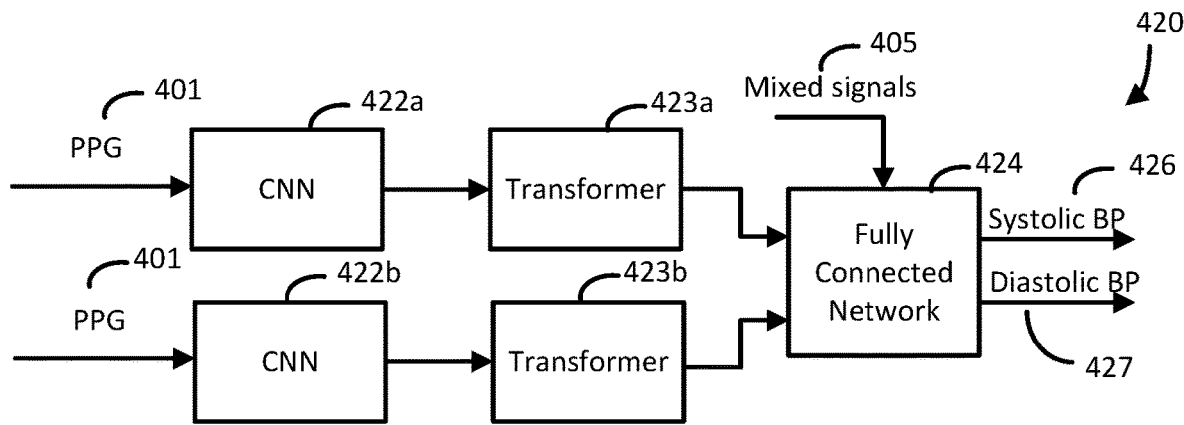

Turning to FIG. 4C, an example architecture 420 is shown in which systolic blood pressure and diastolic blood pressure are generated using a single fully connected network 424. However, features of input series of PPG data 401 may be independently extracted (e.g., by CNNs) and/or weighted based on importance to determining blood pressure (e.g., by transformer networks) in separate branches corresponding to systolic blood pressure and diastolic blood pressure prior to combination by fully connected network 424. As illustrated in FIG. 4C, input series of PPG data may be used as an input to a CNN 422a and also used as an input to CNN 422b. In some embodiments, CNN 422a may be trained to identify, extract, or amplify features of input series of PPG data 401 of importance to determining a systolic blood pressure. In some embodiments, CNN 422b may be trained to identify, extract, or amplify features of input series of PPG data 401 of importance to determining a diastolic blood pressure. An output of CNN 422a may be used as an input to transformer network 423a. An output of CNN 422b may be used as an input to transformer network 423b. The output of transformer network 423a and the output of transformer network 423b may be combined and the combined output may be used as an input to fully connected network 424. In some embodiments, fully connected network 424 may receive mixed signals 405. Fully connected network 424 may generate a systolic blood pressure 426 and/or a diastolic blood pressure 427.

In some embodiments, training the machine learning model shown in architecture 420 may involve learning weights of CNN 422a, CNN 422b, transformer network 423a, transformer network 423b, and/or fully connected network 424. In some embodiments, the weights may be learned by minimizing one or more loss functions. For example, a loss function used to determine weights of fully connected network 424 may correspond to a combined error of systolic blood pressure 426 and diastolic blood pressure 427 relative to a ground truth systolic blood pressure and a ground truth diastolic blood pressure, respectively. As another example, a loss function used to determine weights of CNN 422a and/or transformer network 423a (corresponding to the systolic blood pressure branch) may be based on an error of systolic blood pressure 426 relative to a ground truth systolic blood pressure. As yet another example, a loss function used to determine weights of CNN 422b and/or transformer network 423b (corresponding to the diastolic blood pressure branch) may be based on an error of diastolic blood pressure 327 relative to a ground truth diastolic blood pressure.

Figure 4D:
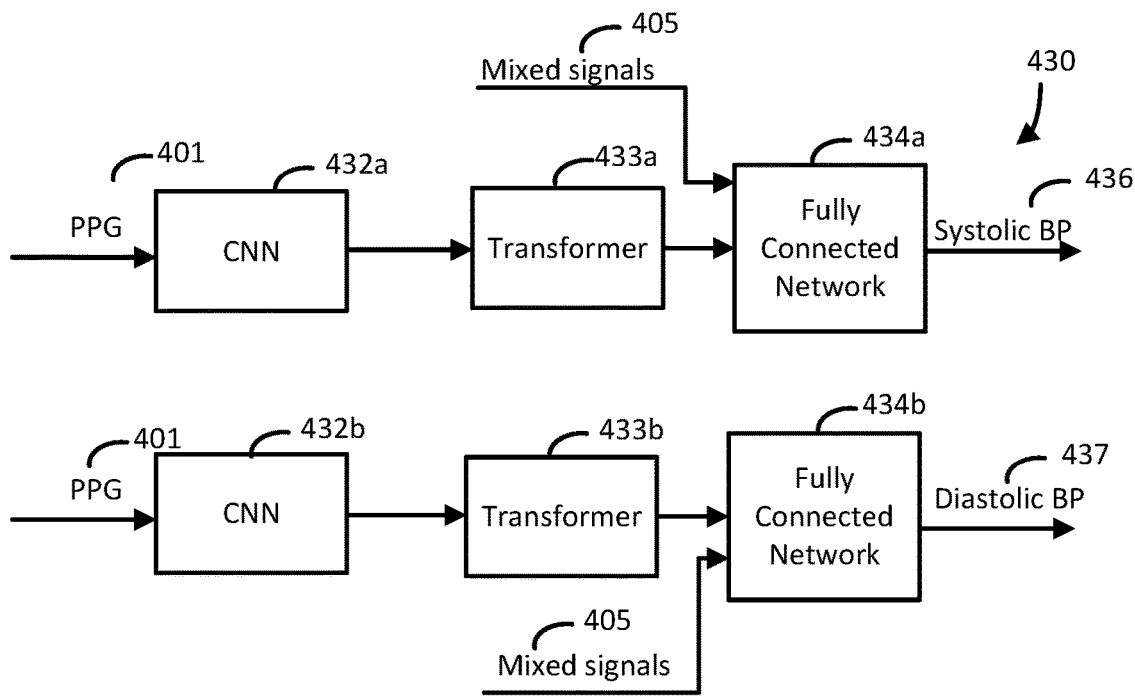

Turning to FIG. 4D, an example architecture 430 is shown in which systolic blood pressure and diastolic blood pressure are generated using fully separate branches. As illustrated in FIG. 4D, input series of PPG data may be used as an input to a CNN 432a and also used as an input to CNN 432b. In some embodiments, CNN 432a may be trained to identify, extract, or amplify features of input series of PPG data 401 of importance to determining a systolic blood pressure. In some embodiments, CNN 432b may be trained to identify, extract, or amplify features of input series of PPG data 401 of importance to determining a diastolic blood pressure. An output of CNN 432a may be used as an input to transformer network 433a. An output of CNN 432b may be used as an input to transformer network 433b. The output of transformer network 433a may be used as an input to fully connected network 434a. The output of transformer network 433b may be used as an input to fully connected network 434b. In some embodiments, fully connected network 434a and/or fully connected network 434b may receive mixed signals 405. Fully connected network 434a may generate a systolic blood pressure 436. Fully connected network 434b may generate a diastolic blood pressure 437.

In some embodiments, training the machine learning model shown in architecture 430 may involve learning weights of CNN 432a, CNN 432b, transformer network 433a, transformer network 433b, fully connected network 434a, and/or fully connected network 434b. In some embodiments, the weights may be learned by minimizing one or more loss functions. For example, a loss function used to determine weights of networks in a systolic blood pressure branch (e.g., CNN 432a, transformer network 433a, and/or fully connected network 434a) may be based on an error of systolic blood pressure 436 relative to a ground truth systolic blood pressure. As another example, a loss function used to determine weights of networks in a diastolic blood pressure branch (e.g., CNN 432b, transformer network 433b, and/or fully connected network 434b) may be based on an error of diastolic blood pressure 437 relative to a ground truth diastolic blood pressure. In some embodiments, the weights may be learned by minimizing systolic and diastolic blood pressure loss functions together and/or separately.

Turning to FIGS. 5A and 5B, example architectures of machine learning models that use, at a current iteration or time step, information from a previous iteration or time step, are shown in accordance with some embodiments. Use of information from previous iterations or time steps may serve to smooth outputs (e.g., predicted blood pressure values) generated by the machine learning model. Moreover, use of information from previous iterations or time steps may reduce a prediction error between a blood pressure generated by the machine learning model and an actual blood pressure.

Example architecture 500 of FIG. 5A depicts an example in which an output from a fully connected network at a previous time step is used as an input to the fully connected network at a current time step. As illustrated, CNN 502 may receive a time series of input PPG data, which may include PPG data at time steps t-1 and t. Similar to what is described above in connection with FIG. 4A, CNN 502 may generate an output which is passed to transformer network 503. Transformer network 503 may generate an output which is passed to fully connected network 504. Fully connected network 504 may then generate a systolic blood pressure 512 and a diastolic blood pressure 514. Systolic blood pressure 512 and/or diastolic blood pressure 514 may then be used by fully connected network 504 to generate a systolic blood pressure 516 and/or a diastolic blood pressure 518 at a next time step (e.g., time step t+1). For example, at the next time step (e.g., time step t+1), CNN 502 may generate an output that is passed to transformer network 504. Continuing further with this example, transformer network 503 may generate an output which is passed to fully connected network 504. Continuing still further with this example, fully connected network 504 may generate an output (e.g., systolic blood pressure 516 and/or diastolic blood pressure 518) that is based at least in part on systolic blood pressure 512 and/or diastolic blood pressure 514. It should be noted that although CNN 502, transformer network 503, and fully connected network 504 are shown as replicated across different time steps, each network is not replicated (e.g., as implemented in hardware). Rather, each network iterates over multiple time steps, and uses an output from a previous time step at a current time step.

Example architecture 550 of FIG. 5B depicts an example in which outputs from CNN 502 and/or transformer network 503 from a previous time step are passed via hidden layers to CNN 502 and/or transformer network 503 at a current time step. For example, CNN 502 may generate an output, based on an input series of PPG data at time step t, which is used by CNN 502 at time step t+1. The output of CNN 502 may correspond to one or more extracted features, for example, at one or more convolutional layers of CNN 502. The extracted features may be passed by hidden layers 552. As another example, transformer network 503 may generate an output at time step t, which is used by transformer network 503 at time step t+1. The output of transformer network 503 may include one or more attention networks, one or more encoder layers, or the like. The extracted features may be passed by hidden layers 554. In some embodiments, information passed from a previous time step may be merged with information at a current time step. For example, features extracted by CNN 502 at time step/and passed by hidden layers 552 may be merged with an output of CNN 502 at time step t+1. Examples of merging may include adding, interpolation, averaging, or the like. Additionally or alternatively, in some embodiments, information passed from a previous time step may be processed in parallel with information at a current time step. For example, features extracted by CNN 502 at a time step t and passed by hidden layers 552 may be processed by transformer network 503 at time step t+1 in parallel with features extracted by CNN 502 at a time step t+1. It should be understood that although example architecture 550 depicts information sharing across time steps for both CNN 502 and transformer network 503, this is merely exemplary. In some embodiments, information sharing for CNN 502 or transformer network 503 may be omitted. It should be noted that although CNN 502, transformer network 503, and fully connected network 504 are shown as replicated across different time steps, each network is not replicated (e.g., as implemented in hardware). Rather, each network iterates over multiple time steps, and uses an output from a previous time step at a current time step.

It should be understood that although FIGS. 5A and 5B depict example architectures in which information is shared via hidden layers from a previous time step to a current time step in connection with a network topology that uses a single branch to generate both systolic and diastolic blood pressures (e.g., the network topology shown in and described above in connection with FIG. 4A), this is merely exemplary. For example, in some embodiments, hidden layers used to share information from a previous time step to a current time step may be implemented with architectures that utilize different branches to determine a systolic blood pressure and a diastolic blood pressure. As a more particular example, in some embodiments, manners of information sharing across time steps as shown in FIGS. 5A and 5B may be implemented in connection with any of the architectures shown in and described above in connection with FIGS. 4B, 4C, and/or 4D.

As described above, a CNN, when included in a machine learning model, serves to condition an input series of PPG data. For example, the CNN may be used to identify features at various levels of abstraction, such as peak of PPG waveform, a slope of PPG waveform, etc. As described above, in some embodiments, a CNN may be replaced by a filtering block that performs a Fourier transform of the input series of PPG data, that performs a STFT of the input series of PPG data, that performs a wavelet transform of the input series of PPG data, or the like.

Additionally or alternatively, in some embodiments, a CNN (or a CNN and a transformer network) may be replaced by an encoder portion of a trained encoder-decoder network, where the encoder-decoder network has been trained to reconstruct the input series of PPG data, to reconstruct a corresponding series of ECG data, and/or to reconstruct a corresponding series of ABP data. For example, once trained, an encoder portion of an encoder-decoder network that has been trained, using an input series of PPG data, to reconstruct the input series of PPG data (sometimes referred to herein as an "auto-encoder") may then identify or extract features of the input series of PPG data that are particularly relevant to or are of particular salience to PPG data. As another example, once trained, an encoder portion of an encoder-decoder network that has been trained, using an input series of PPG data, to reconstruct a corresponding series of ECG data, may identify or extract features of the input series of PPG data that are particularly relevant to corresponding ECG data. As yet another example, once trained, an encoder portion of an encoder-decoder network that has been trained, using an input series of PPG data, to reconstruct a corresponding series of ABP data, may identify or extract features of the input series of PPG data that are particularly relevant to corresponding ABP data. Examples of features that may be identified or extracted by a trained encoder portion of an encoder-decoder network include: particular shapes or types of curves in the input series of data (e.g., an input series of PPG data, an input series of ECG data, and/or an input series of ABP data), such as peaks, notches, valleys, or the like; distances or time durations between particular shapes or types of curves in the input series of data, and/or widths and/or areas of particular shapes or types of curves in the input series of data. It should be noted that the encoder may identify features which may not be identifiable or easily expressed by a human. In other words, an encoder portion of a trained encoder-decoder network may be able to extract, from an input series of PPG data, features that are of particular relevant to the type of data the encoder-decoder network has been trained to reconstruct. By replacing a CNN (e.g., a CNN shown in any of FIGS. 4A-4D, 5A, and/or 5B) with the encoder portion of a trained encoder-decoder network, the machine learning model may be able to start by extracting features of particular relevance or salience, which may improve an overall performance of the machine learning model. In some embodiments, an output of an encoder portion of a trained encoder-decoder network may be referred to as a "compressed representation" of a series of PPG data.

Figure 6:
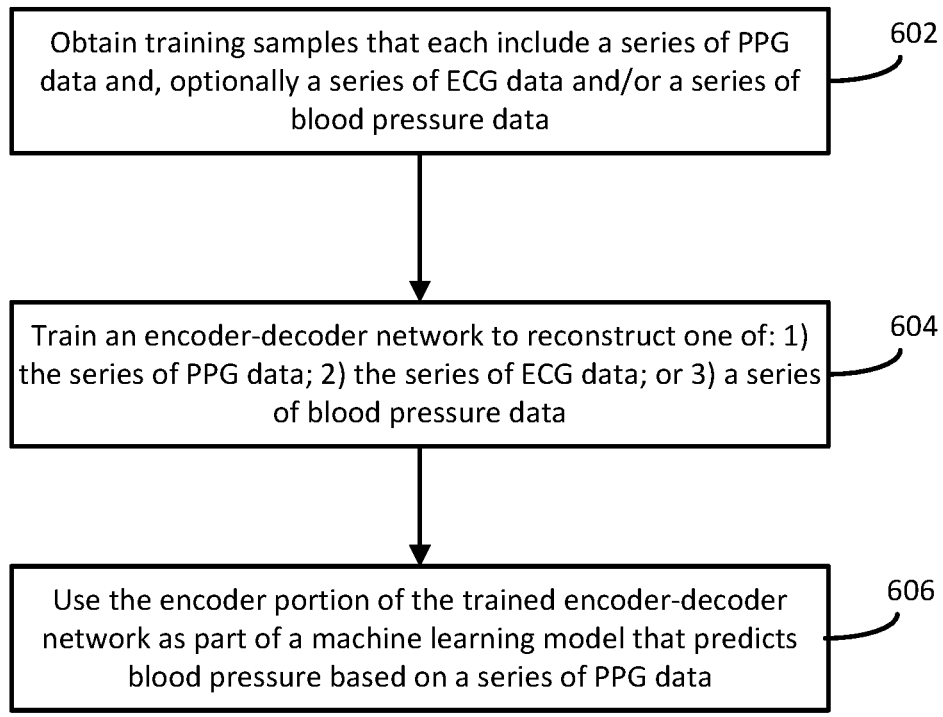
FIG. 6 is a flowchart of a process for generating a compressed representation of a series of PPG data according to certain embodiments.

FIG. 6 shows an example 600 of a process for generating and using a compressed representation of a series of PPG data using an encoder-decoder network in accordance with some embodiments. In some embodiments, blocks of process 600 may be implemented by a server. It should be noted that one or more blocks of process 600 may be executed in parallel. Additionally, in some embodiments, one or more blocks of process 600 may be omitted and/or performed in an order other than what is shown in FIG. 6.

Process 600 can begin at 602 by obtaining training samples that each include a series of PPG data and, optionally, a series of ECG data and/or a series of blood pressure data. The training samples may be obtained from, for example, a database that includes physiological measurements from multiple people (e.g., patients in a healthcare setting) It should be noted that the training data used by process 600 may be the same or different than the data used by process 200 of FIG. 2. Each series of data may include multiple measurements from a single person measured at different time points. The series of blood pressure data may include a series of ABP measurements. Process 600 may obtain any suitable number of training samples (e.g., one hundred, five hundred, one thousand, or the like). In some embodiments, training samples may be selected to satisfy any suitable criteria, such as that an age of a person associated with the data is within a predetermined range, that a person associated with the data does not have particular health conditions (e.g., congestive heart failure, or the like), etc.

At 604, process 600 can train an encoder-decoder network to reconstruct, using the series of PPG data, at least one of: 1) the series of PPG data; 2) the series of ECG data; or 3) the series of blood pressure data. In instances in which the encoder-decoder network is trained to reconstruct the PPG data itself, the encoder-decoder network may be referred to as an auto-encoder. In such embodiments, each training sample may include a series of PPG data. In instances in which the encoder-decoder network is trained to reconstruct the series of ECG data or the series of blood pressure data, the encoder-decoder network may be referred to as a cross-encoder. In such embodiments, each training sample may include a series of PPG data, and a corresponding target series of data (e.g., target ECG data or target blood pressure data) that is to be reconstructed by the encoder-decoder network.

The encoder-decoder network may have any suitable number of encoding layers and/or decoding layers (e.g., four layers, five layers, eight layers, or the like). In some embodiments, each encoding layer may include a convolutional layer, a non-linear layer (e.g., a rectified linear unit layer, or the like), by a batch normalization layer, by a pooling layer (e.g., a max pooling layer, or the like), or a dropout layer (e.g., during training). In some embodiments, there may be skip connections between any of the encoding and/or decoding layers. Such skip connections may serve to propagate information from one layer to another layer that does not immediately precede or succeed it. The encoder-decoder network may be trained to minimize a loss function that represents an error or difference between an output generated by the decoder network and a ground truth input provided to the encoder network. For example, in an instance in which the encoder-decoder network is trained to reconstruct the PPG data, the error may correspond to a difference between the output of the decoder and the input series of PPG data. As another example, in an instance in which the encoder-decoder network is trained to reconstruct a series of ECG data, the error may correspond to a difference between the output of the decoder and an input series of ECG data included in each training sample. As yet another example, in an instance in which the encoder-decoder network is trained to reconstruct a series of blood pressure data (e.g., ABP data), the error may correspond to a difference between the output of the decoder and an input series of blood pressure data (e.g., ABP data) included in each training sample.

At 606, process 600 may use the encoder portion of the trained encoder-decoder network as part of a machine learning model that predicts blood pressure based on a series of PPG data. For example, the encoder portion of the trained encoder-decoder network may replace one or more CNNs of the machine learning model. Example CNNs which may be replaced by the encoder portion are shown in and described above in connection with FIGS. 4A-4D, 5A, and 5B. It should be noted that, in machine learning model architectures that utilize two or more CNNs (e.g., as shown in and described above in connection with FIGS. 4C and 4D), each CNN may be replaced by a different encoder portion (e.g., corresponding to a different trained encoder-decoder network). For example, a first CNN that is part of a systolic blood pressure branch may be replaced by a first encoder network. Continuing with this example, a second CNN that is part of a diastolic blood pressure branch may be replaced by a different encoder network that is different from the first encoder network. In some embodiments, the first encoder network and the second encoder network may be generated based on encoder-decoder networks that have been trained to reconstruct different types of physiological metrics. For example, the first encoder network may be generated based on an encoder-decoder network trained to reconstruct a series of ECG data, while the second encoder network may be generated based on encoder-decoder network trained to reconstruct a series of ABP data. As another example, the first encoder network may be generated by adding and/or concatenating any suitable combination of a series of PPG data, a series of ECG data, and/or a series of ABP data. Continuing with this example, the second encoder network may similarly be generated by adding and/or concatenating any suitable combination of a series of PPG data, a series of ECG data, and/or a series of ABP data.

Figure 7:
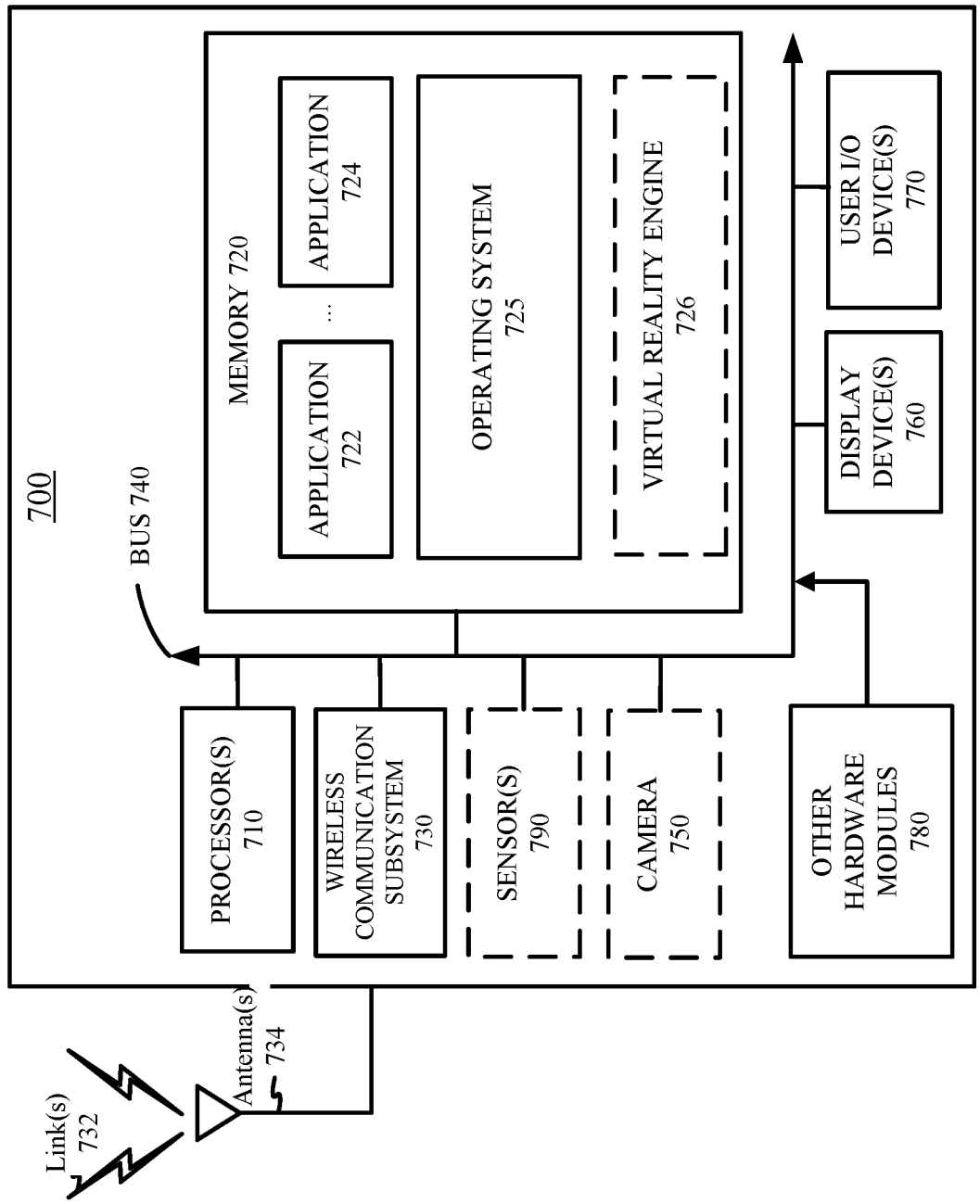
FIG. 7 is a simplified block diagram of an example of a computing system that may be implemented as part of a mobile device and/or a user device according to certain embodiments.

FIG. 7 is a simplified block diagram of an example of a computing system 700 for implementing some of the examples described herein. For example, in some embodiments, computing system may be used to implement a user device (e.g., a mobile device or a wearable computer) that implements the blocks of process 100 shown in and described above in connection with FIG. 1. In the illustrated example, computing system 700 may include one or more processor(s) 710 and a memory 720. Processor(s) 710 may be configured to execute instructions for performing operations at a number of components, and can be, for example, a general-purpose processor or microprocessor suitable for implementation within a portable electronic device. Processor(s) 710 may be communicatively coupled with a plurality of components within computing system 700. To realize this communicative coupling, processor(s) 710 may communicate with the other illustrated components across a bus 740. Bus 740 may be any subsystem adapted to transfer data within computing system 700. Bus 740 may include a plurality of computer buses and additional circuitry to transfer data.

Memory 720 may be coupled to processor(s) 710. In some embodiments, memory 720 may offer both short-term and long-term storage and may be divided into several units. Memory 720 may be volatile, such as static random access memory (SRAM) and/or dynamic random access memory (DRAM) and/or non-volatile, such as read-only memory (ROM), flash memory, and the like. Furthermore, memory 720 may include removable storage devices, such as secure digital (SD) cards. Memory 720 may provide storage of computer-readable instructions, data structures, program modules, and other data for computing system 700. In some embodiments, memory 720 may be distributed into different hardware modules. A set of instructions and/or code might be stored on memory 720. The instructions might take the form of executable code that may be executable by computing system 700, and/or might take the form of source and/or installable code, which, upon compilation and/or installation on computing system 700 (e.g., using any of a variety of generally available compilers, installation programs, compression/decompression utilities, etc.), may take the form of executable code.

In some embodiments, memory 720 may store a plurality of application modules 722 through 724, which may include any number of applications. Examples of applications may include gaming applications, conferencing applications, video playback applications, or other suitable applications. The applications may include a depth sensing function or eye tracking function. Application modules 722-724 may include particular instructions to be executed by processor(s) 710. In some embodiments, certain applications or parts of application modules 722-724 may be executable by other hardware modules 780. In certain embodiments, memory 720 may additionally include secure memory, which may include additional security controls to prevent copying or other unauthorized access to secure information.

In some embodiments, memory 720 may include an operating system 725 loaded therein. Operating system 725 may be operable to initiate the execution of the instructions provided by application modules 722-724 and/or manage other hardware modules 780 as well as interfaces with a wireless communication subsystem 730 which may include one or more wireless transceivers. Operating system 725 may be adapted to perform other operations across the components of computing system 700 including threading, resource management, data storage control and other similar functionality.

Wireless communication subsystem 730 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Computing system 700 may include one or more antennas 734 for wireless communication as part of wireless communication subsystem 730 or as a separate component coupled to any portion of the system. Depending on desired functionality, wireless communication subsystem 730 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.6x, or some other types of network. The techniques described herein may also be used for any combination of WWAN, WLAN, and/or WPAN. Wireless communications subsystem 730 may permit data to be exchanged with a network, other computer systems, and/or any other devices described herein. Wireless communication subsystem 730 may include a means for transmitting or receiving data, such as identifiers of HMD devices, position data, a geographic map, a heat map, photos, or videos, using antenna(s) 734 and wireless link(s) 732. Wireless communication subsystem 730, processor(s) 710, and memory 720 may together comprise at least a part of one or more of a means for performing some functions disclosed herein.

Embodiments of computing system 700 may also include one or more sensors 790. Sensor(s) 790 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 790 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Computing system 700 may include a display module 760. Display module 760 may be a near-eye display, and may graphically present information, such as images, videos, and various instructions, from computing system 700 to a user. Such information may be derived from one or more application modules 722-724, virtual reality engine 726, one or more other hardware modules 780, a combination thereof, or any other suitable means for resolving graphical content for the user (e.g., by operating system 725). Display module 760 may use liquid crystal display (LCD) technology, light-emitting diode (LED) technology (including, for example, OLED, ILED, µLED, AMOLED, TOLED, etc.), light emitting polymer display (LPD) technology, or some other display technology.

Computing system 700 may include a user input/output module 770. User input/output module 770 may allow a user to send action requests to computing system 700. An action request may be a request to perform a particular action. For example, an action request may be to start or end an application or to perform a particular action within the application. User input/output module 770 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to computing system 700. In some embodiments, user input/output module 770 may provide haptic feedback to the user in accordance with instructions received from computing system 700. For example, the haptic feedback may be provided when an action request is received or has been performed.

Computing system 700 may include a camera 750 that may be used to take photos or videos of a user, for example, for tracking the user's eye position. Camera 750 may also be used to take photos or videos of the environment, for example, for VR, AR, or MR applications. Camera 750 may include, for example, a complementary metal-oxide-semiconductor (CMOS) image sensor with a few millions or tens of millions of pixels. In some implementations, camera 750 may include two or more cameras that may be used to capture 3-D images.

In some embodiments, computing system 700 may include a plurality of other hardware modules 780. Each of other hardware modules 780 may be a physical module within computing system 700. While each of other hardware modules 780 may be permanently configured as a structure, some of other hardware modules 780 may be temporarily configured to perform specific functions or temporarily activated. Examples of other hardware modules 780 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 780 may be implemented in software.

In some embodiments, memory 720 of computing system 700 may also store a virtual reality engine 726. Virtual reality engine 726 may execute applications within computing system 700 and receive position information, acceleration information, velocity information, predicted future positions, or some combination thereof of the HMD device from the various sensors. In some embodiments, the information received by virtual reality engine 726 may be used for producing a signal (e.g., display instructions) to display module 760. For example, if the received information indicates that the user has looked to the left, virtual reality engine 726 may generate content for the HMD device that mirrors the user's movement in a virtual environment. Additionally, virtual reality engine 726 may perform an action within an application in response to an action request received from user input/output module 770 and provide feedback to the user. The provided feedback may be visual, audible, or haptic feedback. In some implementations, processor(s) 710 may include one or more GPUs that may execute virtual reality engine 726.

In various implementations, the above-described hardware and modules may be implemented on a single device or on multiple devices that can communicate with one another using wired or wireless connections. For example, in some implementations, some components or modules, such as GPUs, virtual reality engine 726, and applications (e.g., tracking application), may be implemented on a console separate from the head-mounted display device. In some implementations, one console may be connected to or support more than one HMD.

In alternative configurations, different and/or additional components may be included in computing system 700. Similarly, functionality of one or more of the components can be distributed among the components in a manner different from the manner described above. For example, in some embodiments, computing system 700 may be modified to include other system environments, such as an AR system environment and/or an MR environment.

Figure 8:
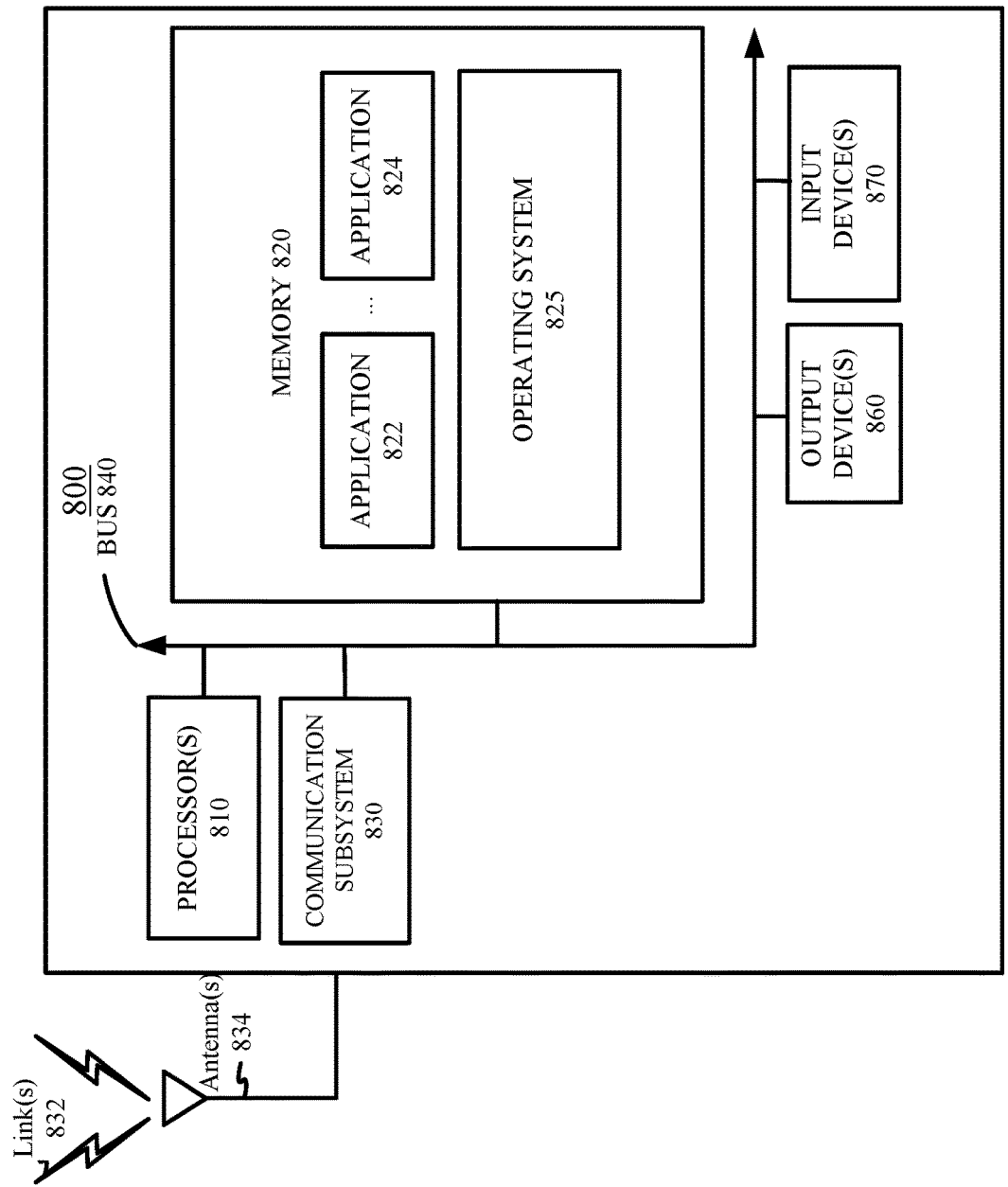
FIG. 8 is a simplified block diagram of an example of a computing system that may be implemented as part of a server according to certain embodiments.

FIG. 8 is a simplified block diagram of an example of a computing system 800 that may be implemented in connection with a server in accordance with some embodiments. For example, computing system 800 may be used to implement a server that generates a trained machine learning model, as described above in connection with FIGS. 2, 3, 4A-4D, 5A, 5B, and 6.

In the illustrated example, computing system 800 may include one or more processor(s) 810 and a memory 820. Processor(s) 810 may be configured to execute instructions for performing operations at a number of components, and can be, for example, a general-purpose processor or microprocessor suitable for implementation within a portable electronic device. Processor(s) 810 may be communicatively coupled with a plurality of components within computing system 800. To realize this communicative coupling, processor(s) 810 may communicate with the other illustrated components across a bus 840. Bus 840 may be any subsystem adapted to transfer data within computing system 800. Bus 840 may include a plurality of computer buses and additional circuitry to transfer data. In some embodiments, processor(s) 810 may be configured to perform one or more blocks of processes 200 or 600, as shown in and described above in connection with FIGS. 2 and 6, respectively.

Memory 820 may be coupled to processor(s) 810. In some embodiments, memory 820 may offer both short-term and long-term storage and may be divided into several units. Memory 820 may be volatile, such as static random access memory (SRAM) and/or dynamic random access memory (DRAM) and/or non-volatile, such as read-only memory (ROM), flash memory, and the like. Furthermore, memory 820 may include removable storage devices, such as secure digital (SD) cards. Memory 820 may provide storage of computer-readable instructions, data structures, program modules, and other data for computing system 800. In some embodiments, memory 820 may be distributed into different hardware modules. A set of instructions and/or code might be stored on memory 820. The instructions might take the form of executable code that may be executable by computing system 800, and/or might take the form of source and/or installable code, which, upon compilation and/or installation on computing system 800 (e.g., using any of a variety of generally available compilers, installation programs, compression/decompression utilities, etc.), may take the form of executable code.

In some embodiments, memory 820 may store a plurality of application modules 822 through 824, which may include any number of applications. Examples of applications may include gaming applications, conferencing applications, video playback applications, or other suitable applications. Application modules 822-824 may include particular instructions to be executed by processor(s) 810. In some embodiments, certain applications or parts of application modules 822-824 may be executable by other hardware modules 880. In certain embodiments, memory 820 may additionally include secure memory, which may include additional security controls to prevent copying or other unauthorized access to secure information.

In some embodiments, memory 820 may include an operating system 825 loaded therein. Operating system 825 may be operable to initiate the execution of the instructions provided by application modules 822-824 and/or manage other hardware modules 880 as well as interfaces with a wireless communication subsystem 830 which may include one or more wireless transceivers. Operating system 825 may be adapted to perform other operations across the components of computing system 800 including threading, resource management, data storage control and other similar functionality.

Communication subsystem 830 may include, for example, an infrared communication device, a wireless communication device and/or chipset (such as a Bluetooth® device, an IEEE 802.11 device, a Wi-Fi device, a WiMax device, cellular communication facilities, etc.), a wired communication interface, and/or similar communication interfaces. Computing system 800 may include one or more antennas 834 for wireless communication as part of wireless communication subsystem 830 or as a separate component coupled to any portion of the system. Depending on desired functionality, communication subsystem 830 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.7x, or some other types of network. The techniques described herein may also be used for any combination of WWAN, WLAN, and/or WPAN. Communications subsystem 830 may permit data to be exchanged with a network, other computer systems, and/or any other devices described herein. Communication subsystem 830 may include a means for transmitting or receiving data, using antenna(s) 834, wireless link(s) 832, or a wired link. Communication subsystem 830, processor(s) 810, and memory 820 may together comprise at least a part of one or more of a means for performing some functions disclosed herein.

In some embodiments, computing system 800 may include one or more output device(s) 860 and/or one or more input device(s) 870. Output device(s) 870 and/or input device(s) 870 may be used to provide output information and/or receive input information.

Embodiments disclosed herein may be used to implement components of an artificial reality system or may be implemented in conjunction with an artificial reality system. Artificial reality is a form of reality that has been adjusted in some manner before presentation to a user, which may include, for example, a virtual reality, an augmented reality, a mixed reality, a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including an HMD connected to a host computer system, a standalone HMD, a mobile device or computing system, or any other hardware platform capable of providing artificial reality content to one or more viewers.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method for determining physiological characteristics, comprising:
    causing light to be emitted by one or more light emitters toward a tissue of a user;
    obtaining samples of transmitted and/or reflected light;
    determining photoplethysmography (PPG) data based on the obtained samples;
    providing the PPG data as an input to a single trained machine learning model, wherein the trained machine learning model has been trained using a training set that comprises matched samples of electrocardiogram (ECG) data and PPG data, wherein the matched samples comprise PPG data labeled, based at least in part on characteristics of the ECG data, to indicate timepoints associated with features relevant to blood pressure, such that the machine learning model is trained to identify features of the PPG data relevant to blood pressure; and
    providing a blood pressure of the user based on an output of the trained machine learning model.

2. The method of claim 1, wherein the matched samples of ECG data and PPG data that were included in the training set comprise PPG data that has been labeled, using the ECG data, to indicate boundaries of pressure waveforms.

3. The method of claim 1, wherein motion data was provided as an input to the trained machine learning model.

4. The method of claim 1, wherein at least one item of demographic information associated with the user was provided as an input to the trained machine learning model.

5. The method of claim 1, wherein recent activity data associated with the user was provided as an input to the trained learning model.

6. The method of claim 1, wherein:
    the one or more light emitters includes one or more light emitters of a wearable device worn by the user; and
    the samples of transmitted and/or reflected light are obtained at one or more light sensors of the wearable device.

7. The method of claim 1, wherein providing the blood pressure of the user includes sending an instruction to present the blood pressure to the user at a wearable device worn by the user.

8. The method of claim 1, wherein:
    the trained machine learning model is trained to identify features of the PPG data relevant to a systolic blood pressure and features of the PPG data relevant to a diastolic blood pressure; and
    providing the blood pressure of the user based on the output of the trained machine learning model includes the systolic blood pressure and the diastolic blood pressure.

9. The method of claim 1, wherein the matched samples of ECG data and PPG data comprise data from multiple people other than the user.

10. A system for determining physiological characteristics, the system comprising:
    one or more processors configured to:
        cause light to be emitted by one or more light emitters toward a tissue of a user;
        obtain samples of transmitted and/or reflected light;
        determine photoplethysmography (PPG) data based on the obtained samples;
        provide the PPG data as an input to a single trained machine learning model, wherein the trained machine learning model has been trained, using a training set that comprises matched samples of electrocardiogram (ECG) data and PPG data, wherein the matched samples comprise PPG data labeled, based at least in part on characteristics of the ECG data, to indicate timepoints associated with features relevant to blood pressure, such that the machine learning model is trained to identify features of the PPG data relevant to blood pressure; and
        provide a blood pressure of the user based on an output of the trained machine learning model.

11. The system of claim 10, wherein the matched samples of ECG data and PPG data that were included in the training set comprise PPG data that has been labeled, using the ECG data, to indicate boundaries of pressure waveforms.

12. The system of claim 10, wherein motion data was provided as an input to the trained machine learning model.

13. The system of claim 10, wherein at least one item of demographic information associated with the user was provided as an input to the trained machine learning model.

14. The system of claim 10, wherein:
    the one or more light emitters includes one or more light emitters of a wearable device worn by the user; and
    the samples of transmitted and/or reflected light are obtained at one or more light sensors of the wearable device.

15. The system of claim 10, wherein the matched samples of ECG data and PPG data comprise data from multiple people other than the user.

16. A smart watch including one or more processors, the one or more processors configured to:
- cause light to be emitted by one or more light emitters of the smart watch toward a tissue of a user;
- obtain samples of transmitted and/or reflected light at one or more light sensors of the smart watch;
- determine photoplethysmography (PPG) data based on the obtained samples;
- provide the PPG data as an input to a single trained machine learning model, wherein the trained machine learning model has been trained, using a training set that comprises matched samples of electrocardiogram (ECG) data and PPG data, wherein the matched samples comprise PPG data labeled, based at least in part on characteristics of the ECG data, to indicate timepoints associated with features relevant to blood pressure, such that the machine learning model is trained to identify features of the PPG data relevant to blood pressure; and
- provide a blood pressure of the user based on an output of the trained machine learning model.

17. The smart watch of claim 16, wherein the matched samples of ECG data and PPG data that were included in the training set comprise PPG data that has been labeled, using the ECG data, to indicate boundaries of pressure waveforms.

18. The smart watch of claim 16, wherein motion data was provided as an input to the trained machine learning model.

19. The smart watch of claim 16, wherein at least one item of demographic information associated with the user was provided as an input to the trained machine learning model.

20. The smart watch of claim 16, wherein providing the blood pressure of the user includes sending an instruction to present the blood pressure to the user at the smart watch.

21. The smart watch of claim 16, wherein the matched samples of ECG data and PPG data comprise data from multiple people other than the user.

22. A non-transitory computer-readable storage medium including executable instructions that, when executed by one or more processors, cause the one or more processors to:
- cause light to be emitted by one or more light emitters toward a tissue of a user;
- obtain samples of transmitted and/or reflected light;
- determine photoplethysmography (PPG) data based on the obtained samples;
- provide the PPG data as an input to a single trained machine learning model, wherein the trained machine learning model has been trained, using a training set that comprises matched samples of electrocardiogram (ECG) data and PPG data, wherein the matched samples comprise PPG data labeled, based at least in part on characteristics of the ECG data, to indicate timepoints associated with features relevant to blood pressure, such that the machine learning model is trained to identify features of the PPG data relevant to blood pressure; and
- provide a blood pressure of the user based on an output of the trained machine learning model.

23. The non-transitory computer-readable storage medium of claim 22, wherein the matched samples of ECG data and PPG data that were included in the training set comprise PPG data that has been labeled, using the ECG data, to indicate boundaries of pressure waveforms.

24. The non-transitory computer-readable storage medium of claim 22, wherein motion data was provided as an input to the trained machine learning model.

25. The non-transitory computer-readable storage medium of claim 22, at least one item of demographic information associated with the user was provided as an input to the trained machine learning model.

26. The non-transitory computer-readable storage medium of claim 22, wherein:
- the one or more light emitters includes one or more light emitters of a wearable device worn by the user; and
- the samples of transmitted and/or reflected light are obtained at one or more light sensors of the wearable device.

27. The non-transitory computer-readable storage medium of claim 22, wherein the matched samples of ECG data and PPG data comprise data from multiple people other than the user.

* * * * *